(12) United States Patent
Kusano et al.

(10) Patent No.: US 10,472,465 B2
(45) Date of Patent: Nov. 12, 2019

(54) METHOD FOR PRODUCING POLYCARBONATE DIOL, POLYCARBONATE DIOL AND POLYURETHANE USING SAME

(71) Applicant: MITSUBISHI CHEMICAL CORPORATION, Chiyoda-ku (JP)

(72) Inventors: Kazunao Kusano, Fukuoka (JP); Kazuki Wakabayashi, Fukuoka (JP); Yoko Nakagawa, Mie (JP); Yusuke Izawa, Mie (JP); Yoshikazu Kanamori, Kanagawa (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/359,071

(22) Filed: Nov. 22, 2016

(65) Prior Publication Data
US 2017/0073466 A1 Mar. 16, 2017

Related U.S. Application Data
(63) Continuation of application No. PCT/JP2015/068029, filed on Jun. 23, 2015.

(30) Foreign Application Priority Data

Jun. 24, 2014 (JP) ................................ 2014-129547

(51) Int. Cl.
| | | |
|---|---|---|
| *C08G 64/30* | (2006.01) | |
| *C08G 18/44* | (2006.01) | |
| *C08G 64/02* | (2006.01) | |
| *C09D 175/06* | (2006.01) | |
| *C09J 175/06* | (2006.01) | |
| *D01F 6/70* | (2006.01) | |
| *D06N 3/14* | (2006.01) | |
| *C08G 18/75* | (2006.01) | |
| *C08G 18/10* | (2006.01) | |
| *C08G 18/24* | (2006.01) | |

(52) U.S. Cl.
CPC .......... *C08G 64/305* (2013.01); *C08G 18/10* (2013.01); *C08G 18/244* (2013.01); *C08G 18/44* (2013.01); *C08G 18/758* (2013.01); *C08G 64/0208* (2013.01); *C09D 175/06* (2013.01); *C09J 175/06* (2013.01); *D01F 6/70* (2013.01); *D06N 3/14* (2013.01); *D06N 3/146* (2013.01); *C08G 2170/40* (2013.01)

(58) Field of Classification Search
CPC .. C08G 64/305; C08G 64/0208; C08G 18/44; C09D 175/06; C09J 175/06
See application file for complete search history.

(56) References Cited

U.S. PATENT DOCUMENTS

| | | | |
|---|---|---|---|
| 4,996,283 A | 2/1991 | Greco et al. | |
| 5,288,839 A | 2/1994 | Greco | |
| 5,606,005 A * | 2/1997 | Oshita | C08G 18/4238 528/83 |
| 6,265,523 B1 * | 7/2001 | Nagai | C08G 64/1608 528/196 |
| 6,313,254 B1 | 11/2001 | Meijs et al. | |
| 6,608,165 B2 * | 8/2003 | Funakoshi | C08G 64/307 528/196 |
| 2003/0018156 A1 | 1/2003 | Meijs et al. | |
| 2003/0060593 A1 * | 3/2003 | Funakoshi | C08G 64/307 528/196 |
| 2010/0292497 A1 | 11/2010 | Masubuchi et al. | |
| 2015/0291724 A1 * | 10/2015 | Kusano | C08G 18/44 524/591 |

FOREIGN PATENT DOCUMENTS

| | | |
|---|---|---|
| CN | 101855269 A | 10/2010 |
| CN | 102216368 A | 10/2011 |
| EP | 2 213 695 A1 | 8/2010 |
| JP | 5-239202 A | 9/1993 |
| JP | 2802657 | 7/1998 |
| JP | 2001-270938 | 10/2001 |
| JP | 3240194 | 12/2001 |
| JP | 2004131394 A * | 4/2004 |
| JP | 2005-048141 | 2/2005 |
| JP | 2008-303285 | 12/2008 |

(Continued)

OTHER PUBLICATIONS

Document N_Jun. 2010_English Translation.*

(Continued)

*Primary Examiner* — Michael L Leonard
(74) *Attorney, Agent, or Firm* — Oblon, McClelland, Maier & Neustadt, L.L.P.

(57) ABSTRACT

The present invention relates to a method for producing a polycarbonate diol, comprising subjecting a compound represented by the following formula (A) containing from 0.01 to 1.0 wt % of an aldehyde derivative, a compound represented by the following formula (B), and a carbonate compound to polycondensation by a transesterification reaction in the presence of a catalyst to produce a polycarbonate diol having a number average molecular weight of 250 to 5,000:

$$HO-(CH_2)_{10}-OH \quad (A)$$

$$HO-R^1-OH \quad (B)$$

wherein in the formula (B), $R^1$ represents a substituted or unsubstituted divalent alkylene group having a carbon number of 3 to 20, wherein the compound of the formula (A) is not included by the formula (B).

16 Claims, No Drawings

(56) References Cited

FOREIGN PATENT DOCUMENTS

| | | | |
|---|---|---|---|
| JP | 2009-051888 | 3/2009 | |
| JP | 2010-150539 A | 7/2010 | |
| JP | 2010235516 * | 10/2010 | ............ C07C 29/80 |
| JP | 2013-010950 | 1/2013 | |
| TW | 201317269 | 5/2013 | |
| WO | WO 02/22708 A1 | 3/2002 | |
| WO | WO2009/063768 | 5/2009 | |
| WO | WO-2010061928 A1 * | 6/2010 | ......... C08G 64/0208 |
| WO | WO2013/039249 | 3/2013 | |
| WO | WO2014/104134 | 7/2014 | |
| WO | WO-2014104134 A1 * | 7/2014 | ............ C08G 18/44 |

OTHER PUBLICATIONS

Document O_Apr. 2004_English Translation.*
JP-2010235516_Oct. 2010_English Translation.*

International Search Report dated Aug. 11, 2015 in PCT/JP2015/068029 filed Jun. 23, 2015 (with English Translation).
Office Action dated Dec. 29, 2016 in Korean Patent Application No. 10-2016-7032583 (with English language translation).
Office Action dated Sep. 14, 2017 in European Patent Application No. 15811986.7.
Extended Search Report dated Jul. 14, 2017 in European Patent Application No. 15811986.7.
Combined Office Action and Search Report dated May 24, 2017 in Chinese Patent Application No. 201580027098.2 (with English translation and English translation of category of cited documents).
Office Action dated Dec. 6, 2018 in corresponding Taiwanese Patent Application No. 106106130 (with English Translation), citing document AO therein, 9 pages.
Office Action dated Dec. 25, 2018 in corresponding Japanese Patent Application No. 2016-180313 (with English Translation), citing documents AP-AR therein, 6 pages.

* cited by examiner

METHOD FOR PRODUCING POLYCARBONATE DIOL, POLYCARBONATE DIOL AND POLYURETHANE USING SAME

TECHNICAL FIELD

The present invention relates to a polycarbonate diol which is useful as a raw material of a polycarbonate-based polyurethane, a production method thereof, and a polyurethane obtained using the same.

BACKGROUND ART

Conventionally, raw materials for the main soft segment of a polyurethane produced on an industrial scale are classified into an ether type typified by polytetramethylene glycol, a polyester polyol type typified by an adipate-based ester, a polylactone type typified by polycaprolactone, and a polycarbonate type typified by polycarbonate diol (Non-Patent Document 1).

On the other hand, a polyurethane using a polycarbonate type typified by polycarbonate diol is considered to be of the best durability grade in terms of heat resistance and hydrolysis resistance and is widely used as a durable film, an artificial leather for cars, an (aqueous) paint, and an adhesive.

Although the polycarbonate diol widely available on the market at present is mainly a polycarbonate diol synthesized from 1,6-hexanediol, due to high crystallinity thereof, a polyurethane formed has a problem that the cohesion of soft segment is high and, among others, the flexibility, elongation, bending and elastic recovery performance specifically at low temperatures are poor, and consequently, its application is limited. Furthermore, it is also pointed out that an artificial leather produced using this polyurethane as a raw material has hard touch and uncomfortable "texture" compared with natural leather.

In order to solve these problems, polycarbonate diols having various structures have been proposed.

For example, long-chain dihydroxy compounds such as 1,9-nonanediol, 1,10-decanediol and 1,12-dodecanediol are used for enhancing the flexibility (Patent Documents 1, 2, 3, 4, 5 and 6).

PRIOR ART LITERATURE

Patent Document

Patent Document 1: Japanese Patent No. 02,802,657
Patent Document 2: Japanese Patent No. 03,240,194
Patent Document 3: JP-A-2013-10950
Patent Document 4: International Publication WO 09/063768
Patent Document 5: JP-A-2001-270938
Patent Document 6: JP-A-2005-48141

Non-Patent Document

Non-Patent Document 1: Katsuji Matsunaga (supervisor), "Polyurethane no Kiso to Oyo (Basic and Application of Polyurethane)", pp. 96-106, CMC Publishing Co., Ltd., issued in November 2006

SUMMARY OF THE INVENTION

Problems that the Invention is to Solve

However, in these conventionally known techniques, attention was not paid to the fact that, for example, at the time of production of the polycarbonate diols described in Patent Documents 1 to 6, an aldehyde derivative contained in a raw material of dihydroxy compound, the content thereof, etc. affect the production efficiency of the polycarbonate diol and furthermore, to the fact that an aldehyde derivative contained in a raw material of dihydroxy compound, the content thereof, etc. affect also the reactivity and physical properties of a polyurethane obtained by using such a polycarbonate diol. Accordingly, these techniques are not advantageous from the viewpoint of production efficiency of a polycarbonate diol in the case of using 1,10-decanediol as a raw material dihydroxy compound, or the cost and quality in industrially producing and utilizing a polyurethane, etc. by using the polycarbonate diol.

The present invention has been made in consideration of the above-described problems which could not be solved by those conventional techniques, and an object of the present invention is to provide a production method of a polycarbonate diol, in which at the time of production of a polycarbonate diol containing 1,10-decane diol as a raw material of dihydroxy compound, the reactivity during polycondensation is satisfactory; and the color tone is good, and provide a polycarbonate diol ensuring that among polycarbonate diols as the raw material of a polyurethane, in the case of using a polycarbonate diol containing 1,10-decanediol as a structural unit, the reactivity during urethane polymerization is good and the obtained polyurethane is excellent in the physical property balance among flexibility, low-temperature properties, chemical resistance and heat resistance.

Means for Solving the Problems

As a result of numerous intensive studies to attain the object above, the present inventors have found that when 1,10-decanediol containing from 0.01 to 1.0 wt % of an aldehyde derivative, a compound represented by the following formula (B) and a carbonate compound are polycondensed by a transesterification reaction in the presence of a catalyst to produce a polycarbonate diol having a number average molecular weight of 250 to 5,000, a polycarbonate diol exhibiting satisfactory reactivity during polycondensation of the polycarbonate diol and having good color tone is obtained and a polyurethane using the polycarbonate diol exhibits good reactivity during urethane polymerization and is excellent in the balance among flexibility, low-temperature properties, chemical resistance and heat resistance. The present invention has been accomplished based on this finding.

Specifically, the gist of the present invention is described below.

(1) A method for producing a polycarbonate diol, comprising subjecting a compound represented by the following formula (A) containing from 0.01 to 1.0 wt % of an aldehyde derivative, a compound represented by the following formula (B), and a carbonate compound to polycondensation by a transesterification reaction in the presence of a catalyst to produce a polycarbonate diol having a number average molecular weight of 250 to 5,000:

$$HO-(CH_2)_{10}-OH \quad (A)$$

$$HO-R^1-OH \quad (B)$$

(wherein in the formula (B), $R^1$ represents a substituted or unsubstituted divalent alkylene group having a carbon number of 3 to 20, wherein the compound of the formula (A) is not included by the formula (B)).

(2) The method for producing a polycarbonate diol according to the above (1), wherein the carbon atom on the main chain of $R^1$ in the formula (B) is a primary, secondary or tertiary carbon atom.
(3) The method for producing a polycarbonate diol according to the above (1) or (2), wherein the formula (B) is at least one compound selected from the group consisting of 1,3-propanediol, 1,4-butanediol and 1,5-pentanediol.
(4) A polycarbonate diol comprising a structural unit derived from a compound represented by the following formula (A) and a structural unit derived from a compound represented by the following formula (B), wherein the polycarbonate diol has a number average molecular weight of 250 to 5,000 and contains from 0.001 to 0.10 wt % of an aldehyde derivative:

HO—(CH$_2$)$_{10}$—OH  (A)

HO—R$^1$—OH  (B)

(wherein in the formula (B), $R^1$ represents a substituted or unsubstituted divalent alkylene group having a carbon number of 3 to 20, wherein the compound of the formula (A) is not encompassed by the formula (B)).
(5) The polycarbonate diol according to the above (4), wherein the carbon atom on the main chain of $R^1$ in the formula (B) is a primary, secondary or tertiary carbon atom.
(6) The polycarbonate diol according to the above (4) or (5), wherein the formula (B) is at least one compound selected from the group consisting of 1,3-propanediol, 1,4-butanediol and 1,5-pentanediol.
(7) A polyurethane obtained by using the polycarbonate diol according to any one of the above (4) to (6).
(8) An artificial leather or a synthetic leather, which is produced by using the polyurethane according to the above (7).
(9) A coating material or a coating agent, which is produced by using the polyurethane according to the above (7).
(10) An elastic fiber which is produced by using the polyurethane according to the above (7).
(11) An aqueous polyurethane coating material which is produced by using the polyurethane according to the above (7).
(12) A pressure sensitive adhesive or an adhesive, which is produced by using the polyurethane according to the above (7).
(13) An active energy ray-curable polymer composition which is obtained by using the polycarbonate diol according to any one of the above (4) to (6).

Effect of the Invention

According to the present invention, a polycarbonate diol exhibiting satisfactory reactivity and having good color tone is obtained, and a polyurethane produced by using the polycarbonate diol is characterized by good reactivity during urethane polymerization and excellent balance among flexibility; low-temperature properties; chemical resistance; and heat resistance, suited to use for elastic fibers; synthetic or artificial leathers; coating materials; and high-performance elastomers, and very useful in industry.

MODE FOR CARRYING OUT THE INVENTION

Although the embodiments of the present invention are described in detail below, the present invention is not limited to the following embodiments and can be carried out by making various modifications within the gist of the invention.

In the description of the present invention, "% by mass", "ppm by mass" and "parts by mass" have the same meanings as "wt %", "ppm by weight" and "parts by weight", respectively. In addition, in case of simply referring to as "ppm", it indicates "ppm by weight".

[1. Production Method of Polycarbonate Diol]

The present invention is characterized by a method for producing a polycarbonate diol, including subjecting a compound represented by the following formula (A) containing from 0.01 to 1.0 wt % of an aldehyde derivative, a compound represented by the following formula (B), and a carbonate compound to polycondensation by a transesterification reaction in the presence of a catalyst to produce a polycarbonate diol having a number average molecular weight of 250 to 5,000:

HO—(CH$_2$)$_{10}$—OH  (A)

HO—R$^1$—OH  (B)

(wherein in the formula (B), $R^1$ represents a substituted or unsubstituted divalent alkylene group having a carbon number of 3 to 20, provided that the compound of the formula (A) is not included by the formula (B)).

<1-1. Structural Feature>

The structural unit derived from a compound represented by the formula (A) according to the production method of a polycarbonate diol and the polycarbonate diol of the present invention is represented, for example, by the following formula (C). The structural unit derived from a compound represented by the formula (B) is represented, for example, by the following formula (D).

[Chem. 1]

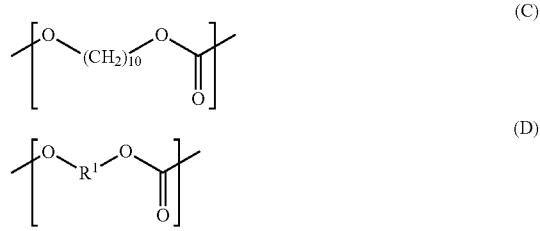

(wherein in the formula (D), $R^1$ represents a substituted or unsubstituted divalent alkylene group having a carbon number of 3 to 20, provided that the formula (C) is not included by the formula (D)).

In the formula (D), $R^1$ may be one kind of a group or a plurality of kinds of groups. In the formula (D), although $R^1$ is a substituted or unsubstituted divalent alkylene group having a carbon number of 3 to 20, for the reason that each of flexibility, low-temperature properties, chemical resistance and heat resistance is improved, it is preferable that the carbon atom on the main chain constituting the alkylene group of $R^1$ is a primary, secondary or tertiary carbon atom and a secondary carbon atom is more preferable.

In the formula (B), $R^1$ represents a substituted or unsubstituted divalent alkylene group having a carbon number of 3 to 20 (excluding a carbon number of 10). Specific compounds of the formula (B) include 1,3-propanediol, 2-methyl-1,3-propanediol, 1,3-butanediol, 1,4-butanediol, 2-methyl-1,4-butanediol, 1,5-pentanediol, 1,6-hexanediol, 1,7-heptanediol, 1,8-octanediol, 2-methyl-1,8-octanediol, 1,9-nonanediol, 1,11-undecanediol, 1,12-dodecanediol, 1,13-tridecanediol, 1,14-tetradecanediol, 1,16-hexadecanediol, 1,18-octadecanediol, 1,12-octadecanediol, 1,20-eicosanediol, etc. Among these, for the reason that the polyurethane formed is excellent in the balance among flexibility, low-temperature properties and chemical resistance, 1,3-propanediol, 2-methyl-1,3-propanediol, 1,3-butanediol, 1,4-butanediol, 2-methyl-1,4-butanediol and 1,5-pentanediol are preferred; at least one compound selected from the group consisting of 1,3-propanediol, 1,4-butanediol and 1,5-pentanediol is more preferred; and 1,4-butanediol is still more preferred. As for the compound represented by the formula (B), one compound may be used, or a plurality of compounds may be used. However, 1,10-decanediol represented by the formula (A) is excluded.

In the production method of a polycarbonate diol of the present invention and the polycarbonate diol obtained by the production method, the polycarbonate diol contains a structural unit derived from a compound represented by the formula (A) and a structural unit derived from a compound represented by the formula (B). By containing a structural unit derived from a compound represented by the formula (A) and a structural unit derived from a compound represented by the formula (B), when a polyurethane is formed, good flexibility, low-temperature properties, chemical resistance and heat resistance can be obtained. The ratio (hereinafter, sometimes referred to as "(A):(B)") between a structural unit derived from a compound represented by the formula (A) and a structural unit derived from a compound represented by the formula (B) is, in terms of molar ratio, (A):(B)=preferably from 40:60 to 1:99, more preferably from 30:70 to 2:98, still more preferably from 25:75 to 5:95, and most preferably from 20:90 to 10:90. If the content ratio of the structural unit derived from a compound represented by the formula (A) is too large, when a polyurethane is formed, the chemical resistance may not be sufficient. If the content ratio of the structural unit derived from a compound represented by the formula (A) is too small, when a polyurethane is formed, the flexibility and low-temperature properties may not be sufficient.

The average carbon number of a dihydroxy compound obtained by hydrolyzing the polycarbonate diol in the production method of a polycarbonate diol of the present invention and in the polycarbonate diol obtained by the production method is from 4 to 5.5, whereby when a polyurethane is formed, good chemical resistance, heat resistance and abrasion resistance can be obtained. It is preferable that the upper limit of the average carbon number is 5.3; 5.2 is more preferable and 5.1 is still more preferable. It is preferable that the lower limit of the average carbon number is 4.3, 4.5 is more preferable and 4.7 is still more preferable. If the average carbon number is less than the lower limit above, the low-temperature properties may be insufficient, and if it exceeds the upper limit above, the chemical resistance, heat resistance and abrasion resistance may be insufficient.

The average carbon number of a dihydroxy compound obtained by hydrolyzing the polycarbonate diol in the production method of a polycarbonate diol of the present invention and in the polycarbonate diol obtained by the production method can be determined from the results of gas chromatography analysis of a dihydroxy compound obtained by hydrolyzing the polycarbonate diol under heating in the presence of an alkali. Specifically, the average carbon number is calculated from the carbon number of a dihydroxy compound obtained by hydrolyzing the polycarbonate diol and the molar ratio of the dihydroxy compound to all dihydroxy compounds.

In the production method of a polycarbonate diol of the present invention, the compound represented by the formula (A) used as a raw material is characterized by containing from 0.01 to 1.0 wt % of an aldehyde derivative. The structure of the aldehyde derivative is a structure where the hydroxy group of the compound represented by the formula (A) is replaced by an aldehyde group. Conversion to the amount of the aldehyde derivative is performed assuming that one hydroxy group is replaced by an aldehyde group. Although the aldehyde group sometimes reacts with a hydroxy group and changes into an acetal group, the aldehyde derivative in the production method of a polycarbonate diol of the present invention as well as in the polycarbonate diol obtained by the production method includes the aldehyde group changed into such an acetal group, and the amount of the aldehyde derivative includes the amount of the aldehyde group changed into an acetal group.

The aldehyde derivative is obtained by a hydrogenation reaction of sebacic acid or sebacic acid ester, each of which is a precursor of the compound represented by the formula (A), and an aldehyde derivative is by-produced in the hydrogenation reaction step. As the method for decreasing the aldehyde derivative in the production stage of the compound represented by the formula (A), increase in the catalyst amount, prolongation of the retention time, excessively elevated hydrogenation pressure, etc. are required in the hydrogenation reaction, which impose a large load in the production stage and are not easy. In addition, acetal requires a hydrogenation catalytic activity different from that for aldehyde and is therefore less likely to be hydrogenated but remains in the compound represented by the formula (A).

After the hydrogenation reaction step, the compound represented by the formula (A) is purified by distillation, and in the distillation stage, the acetal form by-produced in the hydrogenation reaction step may be decomposed to an aldehyde derivative and get mixed into the purified compound of the formula (A). Furthermore, acetal may be produced by a reaction of the aldehyde derivative with a hydroxy group and get mixed into the compound represented by the formula (A).

In general, the aldehyde derivative in a dihydroxy compound having a small carbon umber can be relatively easily separated by distillation/purification. However, in the compound represented by the formula (A) having a large carbon number, the aldehyde derivative has a boiling point close to that of the compound represented by the formula (A) or can be hardly separated as an acetal form and therefore, is likely to remain as an aldehyde derivative or an acetal form in the compound represented by the formula (A).

In the production method of a polycarbonate diol of the present invention, the content of an aldehyde derivative in the compound represented by the formula (A) used as a raw material is from 0.01 to 1.0 wt %, preferably from 0.04 to 1.0 wt %, more preferably from 0.04 to 0.8 wt %, still more preferably from 0.04 to 0.5 wt %, particularly preferably from 0.10 to 0.5 wt %. If the content of the aldehyde derivative is less than 0.01 wt %, a large load and a high cost are disadvantageously involved in the production stage of the compound represented by the formula (A). If the content of the aldehyde derivative exceeds 1.0 wt %, when the compound represented by the formula (A) is used as the raw material of a polycarbonate diol, there is a tendency that the reactivity is reduced or the color tone of the polycarbonate diol obtained by polycondensation is deteriorated. The content of the aldehyde derivative in the compound represented by the formula (A) can be decreased by compulsively completing the hydrogenation reaction step at the time of obtaining the compound represented by the formula (A) by a hydrogenation reaction of sebacic acid or sebacic acid ester. On the other hand, the content of the aldehyde derivative in the compound represented by the formula (A) is increased by oxidation. Therefore, when the compound represented by the formula (A) is, for example, heated in a raw material tank, etc. in the presence of oxygen, the aldehyde derivative in the compound represented by the formula (A) can be increased to the desired content before producing a polycarbonate diol.

If the content of the aldehyde derivative in the compound represented by the formula (A) exceeds 1.0 wt %, when a polyurethane is formed by using the polycarbonate diol, the polyurethane tends to be colored to impair the design effect at the time of forming a molded body. In addition, the diol may not react with an isocyanate and in turn, be not incorporated into the polyurethane skeleton but act as an end-stopping agent, by which it may be difficult to extend the molecular weight of the polyurethane or reduction in reactivity may be caused. Additionally, depending on the polyurethane production conditions, the aldehyde derivative may react with a terminal hydroxyl group and an isocyanate to construct a crosslinked structure, which leads to gelling. Accordingly, the content of the aldehyde derivative contained in the polycarbonate obtained by the production method of a polycarbonate diol of the present invention as well as in the polycarbonate of the present invention is, in terms of the weight of aldehyde derivative, from 0.001 to 0.10 wt %, preferably from 0.003 to 0.10 wt %, more preferably from 0.005 to 0.08 wt %, still more preferably from 0.01 to 0.06 wt %, yet still more preferably from 0.01 to 0.05 wt %, and most preferably from 0.02 to 0.05 wt %.

<1-2. Carbonate Compound>

In the production method of a polycarbonate diol of the present invention and in the polycarbonate diol obtained by the production method, although the carbonate compound (sometimes referred to as "carbonic acid diester") which can be used for production of the polycarbonate diol is not limited as long as the effects of the present invention are not impaired, the carbonate compound includes a dialkyl carbonate, a diaryl carbonate, and an alkylene carbonate. Among these, a diaryl carbonate is preferred in view of reactivity.

Specific examples of the carbonate compound include dimethyl carbonate, diethyl carbonate, dibutyl carbonate, diphenyl carbonate, and ethylene carbonate, and diphenyl carbonate is preferred.

<1-3. Transesterification Catalyst>

The polycarbonate diol in the production method of a polycarbonate diol of the present invention and the polycarbonate diol obtained by the production method can be produced by subjecting a compound represented by the formula (A), a compound represented by the formula (B), and a carbonate compound to polycondensation by a transesterification reaction.

In the production method of a polycarbonate diol of the present invention, a transesterification catalyst (hereinafter, sometimes referred to as "catalyst") is used for accelerating the polymerization. In this case, if a too large amount of catalyst remains in the polycarbonate diol obtained, in production of a polyurethane by using the polycarbonate diol, the catalyst may inhibit the reaction or excessively accelerate the reaction.

Accordingly, although it is not particularly limited, it is preferable that the amount of the catalyst remaining in the polycarbonate diol is, as the content in terms of catalyst metal, 100 ppm by weight or less, and 50 ppm by weight or less is more preferable; and 10 ppm by weight or less is still more preferable.

As for the transesterification catalyst, any compounds which are generally recognized as having a transesterification ability may be used without limitation.

Examples of the transesterification catalyst include a compound of a long periodic table (hereinafter, simply referred to as "periodic table") Group 1 metal such as lithium, sodium, potassium, rubidium and cesium; a compound of a periodic table Group 2 metal such as magnesium, calcium, strontium and barium; a compound of a periodic table Group 4 metal such as titanium and zirconium; a compound of a periodic table Group 5 metal such as hafnium; a compound of a periodic table Group 9 metal such as cobalt; a compound of a periodic table Group 12 metal such as zinc; a compound of a periodic table Group 13 metal such as aluminum; a compound of a periodic table Group 14 metal such as germanium, tin and lead; a compound of a periodic table Group 15 metal such as antimony and bismuth; and a compound of a lanthanide metal such as lanthanum, cerium, europium and ytterbium. Among these, from the viewpoint of increasing the transesterification reaction rate, a compound of a periodic table Group 1 metal, a compound of a periodic table Group 2 metal, a compound of a periodic table Group 4 metal, a compound of a periodic table Group 5 metal, a compound of a periodic table Group 9 metal, a compound of a periodic table Group 12 metal, a compound of a periodic table Group 13 metal, and a compound of a periodic table Group 14 metal are preferred; a compound of a periodic table Group 1 metal and a compound of a periodic table Group 2 metal are more preferred; and a compound of a periodic table Group 2 metal is still more preferred. Among the compounds of a periodic table Group 1 metal, compounds of lithium, potassium and sodium are preferred; compounds of lithium and sodium are more preferred; and a sodium compound is still more preferred. Among the compounds of a periodic table Group 2 metal, compounds of magnesium, calcium and barium are preferred; compounds of calcium and magnesium are more preferred; and a magnesium compound is still more preferred. These metal compounds are mainly used as a hydroxide, a salt, etc. In the case of use as a salt, examples of the salt include a halide salt such as chloride, bromide and iodide; a carboxylate salt such as acetate, formate and benzoate; a sulfonate salt such as methanesulfonate, toluenesulfonate and trifluoromethanesulfonate; a phosphorus-containing salt such as phosphate, hydrogenphosphate and dihydrogenphosphate; and an acetylacetonate salt. The catalyst metal may also be used as an alkoxide such as methoxide and ethoxide.

Among these, an acetate, a nitrate, a sulfate, a carbonate, a phosphate, a hydroxide, a halide, and an alkoxide of at least one metal selected from periodic table Group 2 metals are preferably used; an acetate, a carbonate, and a hydroxide of a periodic table Group 2 metal are more preferably used; an acetate, a carbonate and a hydroxide of magnesium or calcium are still more preferably used; an acetate of magnesium or calcium is yet still more preferably used; and magnesium acetate is most preferably used.

<1-4. Molecular Chain Terminal>

In the production method of a polycarbonate diol of the present invention and in the polycarbonate diol obtained by the production method, the molecular chain terminal of the polycarbonate diol is mainly a hydroxyl group. However, in the case of a polycarbonate diol obtained by the reaction of a dihydroxy compound with a carbonate compound, a polycarbonate diol in which the molecular chain terminal is partially not a hydroxyl group may be present as an impurity. Specific examples thereof include a structure where the molecular chain terminal is an alkyloxy group or an aryloxy group, and many of these terminals are derived from the carbonate compound.

For example, in the case where diphenyl carbonate, dimethyl carbonate, diethyl carbonate or ethylene carbonate is used as the carbonate compound, a phenoxy group (PhO—) as an aryloxy group, a methoxy group (MeO—) as an alkyloxy group, an ethoxy group (EtO—) or a hydroxyethoxy group (HOCH$_2$CH$_2$O—) may remain, respectively, as a molecular chain terminal (here, Ph represents a phenyl group, Me represents a methyl group, and Et represents an ethyl group).

In the molecular chain terminal of the polycarbonate diol, it is preferable that the ratio of the number of carbonate compound-derived terminal groups to the total number of terminal groups is 10 mol % or less; 5 mol % or less is more preferable; 3 mol % or less is still more preferable; and 1 mol % or less is particularly preferable.

<1-5. Hydroxyl Value>

In the production method of a polycarbonate diol of the present invention and in the polycarbonate diol obtained by the production method, the lower limit of the hydroxyl value is 20 mg-KOH/g; 25 mg-KOH/g is preferable; 30 mg-KOH/g is more preferable; 35 mg-KOH/g is still more preferable. The upper limit of the hydroxyl value of the polycarbonate diol is 450 mg-KOH/g; 230 mg-KOH/g is preferable; 150 mg-KOH/g is more preferable; 120 mg-KOH/g is still more preferable; 75 mg-KOH/g is yet still more preferable; 60 mg-KOH/g is particularly preferable; and 45 mg-KOH/g is most preferable. If the hydroxyl value is less than the lower limit above, the viscosity becomes excessively high which makes the handling to be difficult at the time of polyurethane formation. If the hydroxyl value exceeds the upper limit above, in formation of a polyurethane, physical properties such as flexibility and low-temperature properties may be insufficient.

<1-6. Molecular Weight/Molecular Weight Distribution>

In the production method of a polycarbonate diol of the present invention and in the polycarbonate diol obtained by the production method, it is preferable that the lower limit of the number average molecular weight (Mn) determined from the hydroxyl value is 250; 300 is more preferable, 400 is still more preferable. On the other hand, it is preferable that the upper limit of the number average molecular weight (Mn) of the polycarbonate diol is 5,000; 4,000 is preferable; and 3,000 is more preferable. If Mn of the polycarbonate diol is less than the lower limit above, in formation of a urethane, flexibility may not be sufficiently obtained. If it exceeds the upper limit above, the viscosity may be increased, which impairs the handling at the time of polyurethanization.

In the production method of a polycarbonate diol of the present invention and in the polycarbonate diol obtained by the production method, although the weight average molecular weight/number average molecular weight (Mw/Mn), i.e., the molecular weight distribution, is not particularly limited, it is preferable that the lower limit is 1.5; and 1.8 is more preferable. It is preferable that the upper limit of the weight average molecular weight/number average molecular weight (Mw/Mn) is 3.5 and 3.0 is more preferable. If the molecular weight distribution exceeds the range above, the physical properties of a polyurethane produced by using the polycarbonate diol have a tendency, for example, to become hard at low temperatures or decrease in the elongation. If it is intended to produce a polycarbonate diol having a molecular weight distribution less than the range above, a high-level purification operation such as removal of an oligomer may be required.

The weight average molecular weight is a weight average molecular weight in terms of polystyrene, the number average molecular weight is a number average molecular weight in terms of polystyrene, and these can be determined usually by gel permeation chromatography (sometimes simply referred to as GPC).

<1-7. Ratio of Raw Materials, Etc. Used>

In the production of a polycarbonate diol of the present invention, although the amount of the carbonate compound used is not particularly limited, usually, in terms of the molar ratio per mol of the total of dihydroxy compounds, it is preferable that the lower limit is 0.35; 0.50 is more preferable; and 0.60 is still more preferable, while it is preferable that the upper limit is 1.00; 0.98 is more preferable; 0.97 is still more preferable. If the amount of the carbonate compound used exceeds the upper limit above, the ratio of a polycarbonate diol in which the terminal group is not a hydroxyl group may be increased or the molecular weight may not fall in a predetermined range. If the amount used is less than the lower limit above, the polymerization may not proceed until reaching a predetermined molecular weight.

<1-8. Catalyst Deactivator>

As described above, in the case of using a catalyst at the time of polymerization reaction, the catalyst usually remains in the polycarbonate diol obtained, and due to the remaining catalyst, a rise in the molecular weight; a change in the composition; deterioration of color tone, etc. may occur when the polycarbonate diol is heated, or the polyurethanization reaction may not be controlled. In order to suppress the effect of the remaining catalyst, the transesterification catalyst is preferably deactivated by adding, for example, a phosphorus-based compound in a substantially equimolar amount to the transesterification catalyst used. Furthermore, after the addition, by applying a heating treatment, etc. as described later, the transesterification catalyst can be efficiently deactivated. As the phosphorous-based compound, phosphoric acid and phosphorous acid are preferred because of their high effect with a small amount, and phosphoric acid is more preferred.

The phosphorus-based compound used for deactivation of the transesterification catalyst includes, for example, an inorganic phosphoric acid such as phosphoric acid and phosphorous acid, and an organic phosphoric acid ester such as dibutyl phosphate, tributyl phosphate, trioctyl phosphate, triphenyl phosphate and triphenyl phosphite. One of these compounds may be used alone, or two or more kinds thereof may be used in combination.

The amount of the phosphorus-based compound used is not particularly limited and, as described above, may be sufficient if it is substantially equimolar to the amount of the transesterification catalyst used. Specifically, relative to 1 mol of the transesterification catalyst used, it is preferable that the upper limit is 5 mol; and 2 mol is more preferable, while it is preferable that the lower limit is 0.6 mol; 0.8 mol is more preferable; and 1.0 mol is still more preferable. If a phosphorous-based compound in an amount less than the range above is used, rise in the molecular weight; change of the composition; deterioration of color tone; etc. may occur in the polycarbonate diol, or deactivation of the transesterification catalyst may be inadequate, making it impossible to sufficiently reduce the reactivity of the polycarbonate diol with an isocyanate group in use of the obtained polycarbonate diol, for example, as a raw material for the production of a polyurethane. If a phosphorus-based compound is used in an amount exceeding the range above, the polycarbonate diol obtained may be colored or in case of formation of a polyurethane by using the polycarbonate diol as a raw material, the polyurethane is readily hydrolyzed and furthermore, the phosphorus-based compound may bleed out.

Although deactivation of the transesterification catalyst by the addition of a phosphorus-based compound may be performed at room temperature, when a heating treatment is applied, more efficient deactivation is achieved. Although the temperature of the heating treatment is not particularly limited, it is preferable that the upper limit is 180° C.; 150° C. is more preferable; is still more preferable 120° C.; 100° C. is particularly preferable, and it is preferable that the lower limit is 50° C.; 60° C. is more preferable; and 70° C. is still more preferable. If the temperature of the heating treatment is less than the range above, deactivation of the transesterification catalyst takes much time and is not efficient, or the degree of deactivation may be insufficient. On the other hand, if the heating treatment temperature exceeds 180° C., the polycarbonate diol obtained may be colored.

Although the time for which the reaction with a phosphorus-based compound is allowed to proceed is not particularly limited, it is usually from 0.1 to 5 hours.

<1-9. Remaining Monomers, Etc.>

In the case where, for example, an aromatic carbonic acid diester such as diphenyl carbonate is used as a raw material, phenols are generated as a byproduct during the production of the polycarbonate diol. Phenols are a monofunctional compound and therefore, have a possibility of working out to an inhibitory factor at the time of production of a polyurethane, and moreover, a urethane bond formed by phenols is weak in its bonding force and may dissociate due to heat in the later step, etc., which allows for regeneration of an isocyanate or phenols to cause a problem. In addition, since phenols are an irritating substance as well, the amount of phenols remaining in the polycarbonate diol is preferably smaller. Specifically, the amount is, in terms of the weight ratio to polycarbonate diol, 1,000 ppm or less is preferable; 500 ppm or less is more preferable; 300 ppm or less is still more preferable; and 100 ppm or less is particularly preferable. For reducing the amount of phenols in the polycarbonate diol, it is effective to make the pressure of polymerization reaction of the polycarbonate diol be a high vacuum of 1 kPa or less in terms of absolute pressure or perform thin-film distillation, etc. after the polymerization of the polycarbonate diol.

A carbonic acid diester used as a raw material at the time of production sometimes remains in the polycarbonate diol. Although the amount of the carbonic acid diester remaining in the polycarbonate diol is not limited, it is preferably smaller. In terms of the weight ratio to polycarbonate diol, it is preferable that the upper limit is 5 wt %; 3 wt % is more preferable; and 1 wt % is still more preferable. If the carbonic acid diester content in the polycarbonate diol is too large, the reaction at the time of polyurethanization may be inhibited. On the other hand, although the lower limit is not particularly limited, 0.1 wt % is preferable; 0.01 wt % is more preferable; and 0 wt % is still more preferable.

A dihydroxy compound used at the time of production sometimes remains in the polycarbonate diol. The amount of the dihydroxy compound remaining in the polycarbonate diol, although it is not limited, is preferably smaller and, in terms of the weight ratio to polycarbonate diol, 1 wt % or less is preferable; 0.1 wt % or less is more preferable; and 0.05 wt % or less is still more preferable. If the amount of the dihydroxy compound remaining in the polycarbonate diol is large, in formation of a polyurethane, the molecular length of the soft segment moiety may be insufficient, by which obtaining desired physical properties may be failed.

The polycarbonate diol sometimes contains a cyclic carbonate (cyclic oligomer) generated as a byproduct at the time of production. For example, in the case where 1,3-propanediol is used, 1,3-dioxan-2-one, a cyclic carbonate formed from two or more molecules thereof, etc. may be generated and contained in the polycarbonate diol. These compounds have a possibility of bringing about a side reaction during the polyurethanization reaction or give rise to turbidity and therefore, are preferably removed as much as possible by making the pressure of polymerization reaction of the polycarbonate diol to be a high vacuum of 1 kPa or less as absolute pressure or performing thin-film distillation, etc. after the synthesis of the polycarbonate diol. Although the content of such a cyclic carbonate in the polycarbonate diol is not limited, in terms of the weight ratio to polycarbonate diol, 3 wt % or less is preferable; 1 wt % or less is more preferable; and 0.5 wt % or less is still more preferable.

[2. Polyurethane]

A polyurethane can be produced by using the polycarbonate diol obtained by the above-described production method of a polycarbonate diol of the present invention.

As to the method for producing the polyurethane of the present invention by using the polycarbonate diol of the present invention, known polyurethanization reaction conditions are usually employed.

For example, the polycarbonate diol of the present invention is reacted with a polyisocyanate and a chain extender at a temperature ranging from ordinary temperature to 200° C., whereby the polyurethane of the present invention can be produced.

Alternatively, the polycarbonate diol of the present invention is firstly reacted with an excess of polyisocyanate to produce a prepolymer having an isocyanate group at the terminal, and the polymerization degree is further increased by using a chain extender, whereby the polyurethane of the present invention can be produced.

<2-1. Polyisocyanate>

The polyisocyanate used for producing a polyurethane by using the polycarbonate diol of the present invention includes various known aliphatic, alicyclic or aromatic polyisocyanate compounds.

Examples thereof include an aliphatic diisocyanate such as tetramethylene diisocyanate, hexamethylene diisocyanate, 2,2,4-trimethylhexamethylene diisocyanate, 2,4,4-trimethylhexamethylene diisocyanate, lysine diisocyanate and dimer diisocyanate obtained by converting a carboxyl group of a dimer acid into an isocyanate group; an alicyclic diisocyanate such as 1,4-cyclohexane diisocyanate, isophorone diisocyanate, 1-methyl-2,4-cyclohexane diisocyanate, 1-methyl-2,6-cyclohexane diisocyanate, 4,4'-dicyclohexylmethane diisocyanate and 1,3-bis(isocyanatomethyl)cyclohexane; and an aromatic diisocyanate such as xylylene diisocyanate, 4,4'-diphenyl diisocyanate, 2,4-tolylene diisocyanate, 2,6-tolylene diisocyanate, m-phenylene diisocyanate, p-phenylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,5-naphthylene diisocyanate, 3,3'-dimethyl-4,4'-biphenylene diisocyanate, polymethylene polyphenylisocyanate, phenylene diisocyanate and m-tetramethylxylylene diisocyanate. One of these compounds may be used alone, or two or more thereof may be used in combination.

Among these, in view of good balance of physical properties of the polyurethane obtained and mass availability at low cost in industry, 4,4'-diphenylmethane diisocyanate, hexamethylene diisocyanate, 4,4'-dicyclohexylmethane diisocyanate and isophorone diisocyanate are preferred.

<2-2. Chain Extender>

The chain extender used at the time of production of the polyurethane of the present invention is, in the case of producing the later-described prepolymer having an isocyanate group, a low-molecular-weight compound having at least two active hydrogens reacting with an isocyanate group, which usually includes a polyol, a polyamine, etc.

Specific examples thereof include linear diols such as ethylene glycol, 1,3-propanediol, 1,4-butanediol, 1,5-pentanediol, 1,6-hexanediol, 1,8-octanediol, 1,9-nonanediol, 1,10-decanediol and 1,12-dodecanediol; branched chain-containing diols such as 2-methyl-1,3-propanediol, 2,2-dimethyl-1,3-propanediol, 2,2-diethyl-1,3-propanediol, 2-methyl-2-propyl-1,3-propanediol, 2,4-heptanediol, 1,4-dimethylolhexane, 2-ethyl-1,3-hexanediol, 2,2,4-trimethyl-1,3-pentanediol, 2-methyl-1,8-octanediol, 2-butyl-2-ethyl-1,3-propanediol and dimer diol; ether group-containing diols such as diethylene glycol and propylene glycol; alicyclic structure-containing diols such as 1,4-cyclohexanediol, 1,4-cyclohexanedimethanol and 1,4-dihydroxyethylcyclohexane; aromatic group-containing diols such as xylylene glycol, 1,4-dihydroxyethylbenzene and 4,4'-methylenebis(hydroxyethylbenzene); polyols such as glycerin, trimethylolpropane and pentaerythritol; hydroxyamines such as N-methylethanolamine and N-ethylethanolamine; polyamines such as ethylenediamine, 1,3-diaminopropane, hexamethylenediamine, triethylenetetramine, diethylenetriamine, isophoronediamine, 4,4'-diaminodicyclohexylmethane, 2-hydroxyethylpropylenediamine, di-2-hydroxyethylethylenediamine, di-2-hydroxyethylpropylenediamine, 2-hydroxypropylethylenediamine, di-2-hydroxypropylethylenediamine, 4,4'-diphenylmethanediamine, methylenebis(o-chloroaniline), xylylenediamine, diphenyldiamine, tolylenediamine, hydrazine, piperazine and N,N'-diaminopiperazine; and water.

One of these chain extenders may be used alone, or two or more thereof may be used in combination. Among these, in view of good balance of physical properties of the polyurethane obtained and mass availability at low cost in industry, 1,4-butanediol, 1,5-pentanediol, 1,6-hexanediol, 1,8-octanediol, 1,9-nonanediol, 1,10-decanediol, 1,4-cyclohexanedimethanol, 1,4-dihydroxyethylcyclohexane, ethylenediamine, 1,3-diaminopropane, isophoronediamine, and 4,4'-diaminodicyclohexylmethane are preferred.

The chain extender in the case of producing the later-described prepolymer having a hydroxyl group is a low-molecular-weight compound having at least two isocyanate groups and specifically includes compounds recited in <2-1. Polyisocyanate>.

<2-3. Chain Terminator>

At the time of production of the polyurethane of the present invention, a chain terminator having one active hydrogen group may be used, if desired, for the purpose of controlling the molecular weight of the polyurethane obtained.

Examples of the chain terminator include aliphatic monools having one hydroxyl group, such as methanol, ethanol, propanol, butanol and hexanol, and aliphatic monoamines having one amino group, such as diethylamine, dibutylamine, n-butylamine, monoethanolamine, diethanolamine and morpholine.

One of these chain terminators may be used alone, or two or more thereof may be used in combination.

<2-4. Catalyst>

In the polyurethane forming reaction at the time of production of the polyurethane of the present invention, there may also be used a known urethane polymerization catalyst typified, for example, by an amine-based catalyst such as triethylamine, N-ethylmorpholine and triethylenediamine, an acid-based catalyst such as acetic acid, phosphoric acid, sulfuric acid, hydrochloric acid and sulfonic acid, and an organic metal salt of, e.g., a tin-based compound, such as trimethyltin laurate, dibutyltin dilaurate, dioctyltin dilaurate and dioctyltin dineodecanoate, or a titanium-based compound. As for the urethane polymerization catalyst, one catalyst may be used alone, or two or more catalysts may be used in combination.

<2-5. Polyol Other than Polycarbonate Diol of the Present Invention>

In the polyurethane forming reaction at the time of production of the polyurethane of the present invention, the polycarbonate diol of the present invention and, if desired, another polyol may be used in combination. The polyol other than the polycarbonate diol of the present invention is not particularly limited as long as it is a polyol employed for normal production of a polyurethane, and examples thereof include a polyether polyol, a polyester polyol, a polycaprolactone polyol, and a polycarbonate polyol other than that of the present invention. For example, in use in combination with a polyether polyol, a polyurethane further improved in the flexibility characterizing the polycarbonate diol of the present invention can be obtained. It is preferable that the weight ratio of the polycarbonate diol of the present invention to the total weight of the polycarbonate diol of the present invention and the polyol other than that is 70% or more and 90% or more is more preferable. If the weight ratio of the polycarbonate diol of the present invention is small, the balance among chemical resistance, flexibility, heat resistance and weather resistance, characterizing the present invention, may be lost.

In the present invention, the polycarbonate diol of the present invention may also be modified and used for the production of a polyurethane. The method for modifying the polycarbonate diol includes a method of introducing an ether group by adding an epoxy compound, such as ethylene oxide, propylene oxide and butylene oxide, to the polycarbonate diol, and a method of introducing an ester group by reacting the polycarbonate diol with a cyclic lactone such as ε-caprolactone, a dicarboxylic acid compound such as adipic acid, succinic acid, sebacic acid and terephthalic acid, or an ester compound thereof. In the ether modification, modification with ethylene oxide, propylene oxide, etc. brings about reduction in the viscosity of the polycarbonate diol and is preferred for the reason of handling property, etc. Among others, when the polycarbonate diol of the present invention is modified with ethylene oxide or propylene oxide, the crystallinity of the polycarbonate diol decreases, thereby improving the flexibility at low temperatures, and in the case of ethylene oxide modification, the water absorptivity or moisture permeability of a polyurethane produced by using the ethylene oxide-modified polycarbonate diol increases, as a result, the performance as an artificial leather/synthetic leather, etc. may be enhanced. However, if the amount of ethylene oxide or propylene oxide added is large, various physical properties, such as mechanical strength, heat resistance and chemical resistance, of a polyurethane produced using the modified polycarbonate diol are reduced. Accordingly, the amount added is suitably from 5 to 50 wt %; preferably from 5 to 40 wt %; and more preferably from 5 to 30 wt %, relative to the polycarbonate diol. In the method of introducing an ester group, modification with ε-caprolactone brings about reduction in the viscosity of the polycarbonate diol and is preferred for the reason of handling property, etc. The amount of ε-caprolactone added is suitably from 5 to 50 wt %; preferably from 5 to 40 wt %; and more preferably from 5 to 30 wt %, relative to the polycarbonate diol. If the amount of ε-caprolactone added exceeds 50 wt %, the hydrolysis resistance, chemical resistance, etc. of a polyurethane produced by using the modified polycarbonate diol are reduced.

<2-6. Solvent>

In the polyurethane forming reaction at the time of production of the polyurethane of the present invention, a solvent may be used.

Preferable solvents include an amide-based solvent such as dimethylformamide, diethylformamide, dimethylacetamide and N-methylpyrrolidone; a sulfoxide-based solvent such as dimethyl sulfoxide; a ketone-based solvent such as methyl ethyl ketone, cyclohexanone and methyl isobutyl ketone; an ether-based solvent such as tetrahydrofuran and dioxane; an ester-based solvent such as methyl acetate, ethyl acetate and butyl acetate; an aromatic hydrocarbon-based solvent such as toluene and xylene; etc. One of these solvents may be used alone, or two or more thereof may be used as a mixed solvent.

Among these, preferable organic solvents are methyl ethyl ketone, ethyl acetate, toluene, dimethylformamide, dimethylacetamide, N-methylpyrrolidone, dimethyl sulfoxide, etc.

In addition, a polyurethane in the form of an aqueous dispersion liquid may also be produced from a polyurethane composition in which the polycarbonate diol of the present invention, a polydiisocyanate, and the above-described chain extender are blended.

<2-7. Production Method of Polyurethane>

As the method for producing the polyurethane of the present invention by using the above-described reaction reagents, a production method employed experimentally or industrially in general may be used.

Examples thereof include a method where the polycarbonate diol of the present invention, another polyol, a polyisocyanate and a chain extender are mixed en bloc and reacted (hereinafter, sometimes referred to as "one-step method"), and a method where the polycarbonate diol of the present invention, another polyol, and a polyisocyanate are firstly reacted to prepare a prepolymer having an isocyanate group at both ends and the prepolymer is reacted with a chain extender (hereinafter, sometimes referred to as "two-step method").

The two-step method passes through a step of previously reacting the polycarbonate diol of the present invention and another polyol with one equivalent or more of a polyisocyanate to prepare a both end isocyanate-terminated intermediate providing a moiety corresponding to the soft segment of a polyurethane. When a prepolymer is once prepared and then reacted with a chain extender in this way, the molecular weight of the soft segment moiety may be easily adjusted, and this is useful in the case where phase separation of a soft segment and a hard segment needs to be certainly achieved.

<2-8. One-Step Method>

The one-step method is also called a one-shot method and is a method of performing the reaction by charging the polycarbonate diol of the present invention, another polyol, a polyisocyanate and a chain extender en bloc.

The amount of the polyisocyanate used in the one-step method is not particularly limited, but when the sum of the total number of hydroxyl groups in the polycarbonate diol of the present invention and another polyol, the number of hydroxyl groups and the number of amino groups in the chain extender is assumed to be 1 equivalent, it is preferable that the lower limit 0.7 equivalents; 0.8 equivalents is more preferable; 0.9 equivalents is still more preferable; 0.95 equivalents is particularly preferable, while it is preferable that the upper limit is 3.0 equivalents; 2.0 equivalents is more preferable; 1.5 equivalents is still more preferable; and 1.1 equivalents is particularly preferable.

If the amount of the polyisocyanate used is too large, it is likely that an unreacted isocyanate causes a side reaction and the viscosity of the polyurethane obtained is excessively increased to make the handling difficult or impair the flexibility, whereas if the amount used is too small, the molecular weight of the polyurethane tends to be not extended sufficiently, failing in obtaining adequate polyurethane strength.

Although the amount of the chain extender used is not particularly limited, when the number obtained by subtracting the number of isocyanate groups in the polyisocyanate from the total number of hydroxyl groups in the polycarbonate diol of the present invention and another polyol is assumed to be 1 equivalent, it is preferable that the lower limit is 0.7 equivalents; 0.8 equivalents is more preferable; 0.9 equivalents is still more preferable; and 0.95 equivalents is particularly preferable, while it is preferable that the upper limit is 3.0 equivalents; 2.0 equivalents is more preferable; 1.5 equivalents is still more preferable, and 1.1 equivalents is particularly preferable. If the amount of the chain extender used is too large, the polyurethane obtained tends to be hardly dissolved in a solvent, making the processing difficult, whereas if the amount used is too small, the polyurethane obtained may be excessively soft, as a result, sufficient strength/hardness, elastic recovery performance or resilient retention performance may not be obtained or the heat resistance may be deteriorated.

<2-9. Two-Step Method>

The two-step method is also called a prepolymer method and mainly includes the following methods:

(a) a method where the polycarbonate diol of the present invention, another polyol, and an excess of polyisocyanate are reacted in a reaction equivalent ratio of polyisocyanate/(polycarbonate diol of the present invention and another polyol) between more than 1 and 10.0 or less to produce a prepolymer with the molecular chain terminal of an isocyanate group and a chain extender is added thereto to produce a polyurethane, and (b) a method where a polyisocyanate, an excess of the polycarbonate diol, and another polyol are previously reacted in a reaction equivalent ratio of polyisocyanate/(polycarbonate diol of the present invention and another polyol) between 0.1 or more and less than 1.0 to produce a prepolymer with the molecular chain terminal of a hydroxyl group and an isocyanate group-terminated polyisocyanate as a chain extender is reacted therewith to produce a polyurethane.

The two-step method can be carried out without a solvent or in the co-presence of a solvent.

The polyurethane production by the two-step method can be performed by any one method of the following (1) to (3):

(1) a polyisocyanate, the polycarbonate diol, and another polyol are firstly reacted directly without using a solvent to synthesize a prepolymer and the prepolymer is used as it is for a chain extension reaction, (2) a prepolymer is synthesized by the method of (1), then dissolved in a solvent and used for the subsequent chain extension reaction, and (3) a polyisocyanate, the polycarbonate diol, and another polyol are reacted with using a solvent from the beginning and thereafter, a chain extension reaction is performed.

In the case of the method of (1), it is important to obtain, at the time of chain extension reaction, a polyurethane in the form of coexisting with a solvent, for example, by a method of dissolving a chain extender in a solvent or simultaneously dissolving the prepolymer and a chain extender in a solvent.

Although the amount of the polyisocyanate used in the method (a) of the two-step method is not particularly limited, when the total number of hydroxyl groups in the polycarbonate diol and another polyol is assumed to be 1 equivalent, in terms of the number of isocyanate groups, the lower limit is preferably more than 1.0 equivalent; more preferably 1.2 equivalents; and still more preferably 1.5 equivalents, while it is preferable that the upper limit is 10.0 equivalents; 5.0 equivalents is more preferable, and 3.0 equivalents is still more preferable.

If the amount of the isocyanate used is too large, an excess of isocyanate group tends to cause a side reaction, failing in achieving the desired physical properties of the polyurethane, whereas if the amount used is too small, the molecular weight of the polyurethane obtained may not be sufficiently extended and the strength or thermal stability may be reduced.

Although the amount of the chain extender used is not particularly limited, when the number of isocyanates contained in the prepolymer is assumed to be 1 equivalent, the lower limit is preferably 0.1 equivalents; more preferably 0.5 equivalents; and still more preferably 0.8 equivalents, while the upper limit is preferably 5.0 equivalents; more preferably 3.0 equivalents, and still more preferably 2.0 equivalents.

At the time of the above-described chain extension reaction, monofunctional organic amines or alcohols may be allowed to coexist for the purpose of adjusting the molecular weight.

Although the amount of the polyisocyanate used in preparing a hydroxyl group-terminated prepolymer in the method (b) of the two-step method is not particularly limited, when the total number of hydroxyl groups in the polycarbonate diol and another polyol is assumed to be 1 equivalent, in terms of the number of isocyanate groups, it is preferable that the lower limit is 0.1 equivalents; 0.5 equivalents is more preferable; 0.7 equivalents is still more preferable, while it is preferable that the upper limit is 0.99 equivalents; 0.98 equivalents is more preferable; 0.97 equivalents is still more preferable.

If the amount of the isocyanate used is too small, the process until obtaining the desired molecular weight by the subsequent chain extension reaction tends to require a longer time, which causes reduction in the production efficiency, whereas if the amount used is too large, the viscosity may be excessively increased to reduce the flexibility of the polyurethane obtained or result in poor handling property and deterioration of the productivity.

Although the amount of the chain extender used is not particularly limited, when the total number of hydroxyl groups in the polycarbonate diol and another polyol used for the prepolymer is assumed to be 1 equivalent, in terms of the total equivalent including the equivalent of the isocyanate group used for the prepolymer, it is preferable that the lower limit is 0.7 equivalents; 0.8 equivalents is more preferable; and 0.9 equivalents is still more preferable, and the upper limit is preferably less than 1.0 equivalent; 0.99 equivalents is more preferable; 0.98 equivalents is still more preferable.

At the time of the above-described chain extension reaction, monofunctional organic amines or alcohols may be allowed to coexist for the purpose of adjusting the molecular weight.

Although the chain extension reaction is usually performed at 0 to 250° C., the temperature varies depending on the amount of solvent, the reactivity of raw material used, the reaction equipment, etc. and is not particularly limited. If the temperature is too low, the reaction may proceed slowly or due to low solubility of the raw material or polymerization product, the production time may be prolonged, whereas if the temperature is too high, a side reaction or decomposition of the polyurethane obtained may occur. The chain extension reaction may be performed with defoaming under reduced pressure.

In the chain extension reaction, a catalyst, a stabilizer, etc. may also be added, if desired.

The catalyst includes, for example, compounds such as triethylamine, tributylamine, dibutyltin dilaurate, stannous octoate, acetic acid, phosphoric acid, sulfuric acid, hydrochloric acid and sulfonic acid, and one compound may be used alone, or two or more compounds may be used in combination. The stabilizer includes, for example, compounds such as 2,6-dibutyl-4-methylphenol, distearyl thiodipropionate, N,N'-di-2-naphthyl-1,4-phenylenediamine and tris(dinonylphenyl)phosphite, and one compound may be used alone, or two or more compounds may be used in combination. Here, in the case where the chain extender is a compound having high reactivity, such as short-chain aliphatic amine, the reaction may be conducted without adding a catalyst.

<2-10. Aqueous Polyurethane Emulsion>

An aqueous polyurethane emulsion can also be produced by using the polycarbonate diol of the present invention.

In this case, at the time of producing a prepolymer by reacting polyols including the polycarbonate diol with an excess of polyisocyanate, the prepolymer is formed by mixing a compound having at least one hydrophilic functional group and at least two isocyanate-reactive groups and made into an aqueous polyurethane emulsion through a neutralization/salt formation step of the hydrophilic functional group, an emulsification step by the addition of water, and a chain extension reaction step.

The hydrophilic functional group in the compound having at least one hydrophilic functional group and at least two isocyanate-reactive groups used here is, for example, a carboxyl group or a sulfonic acid group and is a group neutralizable with an alkaline group. The isocyanate-reactive group is a group generally forming a urethane bond or a urea bond by the reaction with an isocyanate, such as hydroxyl group, primary amino group and secondary amino group, and these groups may be mixed in the same molecule.

The compound having at least one hydrophilic functional group and at least two isocyanate-reactive groups specifically includes 2,2'-dimethylolpropionic acid, 2,2-methylolbutyric acid, 2,2'-dimethylolvaleric acid, etc. The compound also includes diaminocarboxylic acids such as lysine, cystine and 3,5-diaminocarboxylic acid. One of these compounds may be used alone, or two or more thereof may be used in combination. At the time of using such a compound in practice, the compound may be used by neutralizing it with an alkaline compound, e.g., an amine such as trimethylamine, triethylamine, tri-n-propylamine, tributylamine and triethanolamine, sodium hydroxide, potassium hydroxide and ammonia.

In the case of producing an aqueous polyurethane emulsion, as for the amount used of the compound having at least one hydrophilic functional group and at least two isocyanate-reactive groups, in order to raise the dispersion performance in water, it is preferable that the lower limit is 1 wt %; 5 wt % is more preferable; and 10 wt % is still more preferable, relative to the total weight of the polycarbonate diol of the present invention and another polyol. On the other hand, if the compound is added in a too large amount, the characteristic features of the polycarbonate diol of the present invention may not be maintained, and for this reason, it is preferable the upper limit is 50 wt %; 40 wt % is more preferable; and 30 wt % is still more preferable.

In the case of producing an aqueous polyurethane emulsion, the reaction in the prepolymer step may be performed in the co-presence of a solvent such as methyl ethyl ketone, acetone or N-methyl-2-pyrrolidone, or may be performed without a solvent. In the case of using a solvent, the solvent is preferably removed by distillation after the production of an aqueous emulsion.

At the time of producing an aqueous polyurethane emulsion without a solvent by using the polycarbonate diol of the present invention as a raw material, it is preferable that the upper limit of the number average molecular weight determined from the hydroxyl value of the polycarbonate diol is 5,000; 4,500 is more preferable; and 4,000 is still more preferable, and it is preferable that the lower limit is 300; 500 is more preferable; and 800 is still more preferable. If the number average molecular weight determined from the hydroxyl value exceeds 5,000 or falls below 300, the emulsion formation may be difficult.

In synthesizing or storing the aqueous polyurethane emulsion, the emulsion stability may be maintained by using, in combination, for example, an anionic surfactant typified by higher fatty acid, resin acid, acidic fatty alcohol, sulfuric acid ester, higher alkyl sulfonate, alkylaryl sulfonate, sulfonated castor oil and sulfosuccinic acid ester, a cationic surfactant such as primary amine salt, secondary amine salt, tertiary amine salt, quaternary amine salt and pyridinium salt, or a nonionic surfactant typified by a known reaction product of ethylene oxide with a long-chain fatty alcohol or phenols.

In the case of making the prepolymer into an aqueous polyurethane emulsion, an emulsion may also be produced by mixing water with an organic solvent solution of the prepolymer under mechanical high shear in the presence of an emulsifier by, if desired, without passing through a neutralization/salt formation step.

The aqueous polyurethane emulsion produced in this way can be used for various applications. In particular, a chemical raw material having a small environmental impact is recently demanded, and the emulsion can substitute for conventional products with an aim to use no organic solvent.

As to the specific use of the aqueous polyurethane emulsion, for example, utilization for a coating agent, an aqueous coating material, an adhesive, a synthetic leather and an artificial leather is suitable. In particular, the aqueous polyurethane emulsion produced by using the polycarbonate diol of the present invention has flexibility by virtue of containing a structural unit derived from the compound represented by the formula (B) in the polycarbonate diol and therefore, can be utilized effectively as a coating agent, etc., compared with an aqueous polyurethane emulsion with using the conventional polycarbonate diol.

<2-11. Additives>

In the polyurethane of the present invention produced by using the polycarbonate diol of the present invention, various additives such as thermal stabilizer, light stabilizer, coloring agent, bulking agent, stabilizer, ultraviolet absorber, antioxidant, anti-adhesive agent, flame retardant, age resistor and inorganic filler can be added and mixed as long as the characteristic features of the polyurethane of the present invention are not impaired.

The compound usable as the thermal stabilizer includes a phosphorus compound such as aliphatic, aromatic or alkyl-substituted aromatic ester of phosphoric acid or phosphorous acid, hypophosphorous acid derivative, phenylphosphonic acid, phenylphosphinic acid, diphenylphosphonic acid, polyphosphonate, dialkyl pentaerythritol diphosphite and dialkyl bisphenol A diphosphite; a phenolic derivative, among others, a hindered phenol compound; a sulfur-containing compound such as thioether-based, dithioate-based, mercaptobenzimidazole-based, thiocarbanilide-based and thiodipropionic acid ester-based compounds; and a tin-based compound such as tin malate and dibutyltin monoxide.

Specific examples of the hindered phenol compound include "Irganox 1010" (trade name, produced by BASF Japan Ltd.), "Irganox 1520" (trade name, produced by BASF Japan, Ltd.), and "Irganox 245" (trade name, produced by BASF Japan, Ltd.).

The phosphorus compound includes "PEP-36", "PEP-24G", "HP-10" (trade names, all produced by ADEKA Corporation), "Irgafos 168" (trade name, produced by BASF Japan, Ltd.), etc.

Specific examples of the sulfur-containing compound include a thioether compound such as dilauryl thiopropionate (DLTP) and distearyl thiopropionate (DSTP).

Examples of the light stabilizer include benzotriazole-based and benzophenone-based compounds, and specifically, "TINUVIN 622LD", "TINUVIN 765" (both produced by Ciba Specialty Chemicals), "SANOL LS-2626", "SANOL LS-765" (both produced by Sankyo Co., Ltd.), etc. can be used.

Examples of the ultraviolet absorber include "TINUVIN 328" and "TINUVIN 234" (both produced by Ciba Specialty Chemicals).

The coloring agent includes a dye such as direct dye, acid dye, basic dye and metal complex dye; an inorganic pigment such as carbon black, titanium oxide, zinc oxide, iron oxide and mica; an organic pigment such as coupling azo-based, condensed azo-based, anthraquinone-based, thioindigo-based, dioxazone-based and phthalocyanine-based pigments; etc.

Examples of the inorganic filler include short glass fiber, carbon fiber, alumina, talc, graphite, melamine, and white clay.

Examples of the flame retardant include an organic compound containing phosphorus and halogen, an organic compound containing bromine or chlorine, and additive and reactive flame retardants such as ammonium polyphosphate, aluminum hydroxide and antimony oxide.

One of these additives may be used alone, or two or more thereof may be used in any combination in an arbitrary ratio.

The lower limit of the amount of such an additive added is, in terms of the weight ratio to polyurethane, 0.01 wt % is preferable; 0.05 wt % is more preferable; and 0.1 wt % is still more preferable, and it is preferable that the upper limit is 10 wt %; 5 wt % is more preferable; and 1 wt % is still more preferable. If the amount of the additive added is too small, the addition effect cannot be sufficiently obtained, and if the amount added is too large, the additive may precipitate in the polyurethane or cause turbidity.

<2-12. Polyurethane Film/Polyurethane Sheet>

In the case of producing a film by using the polyurethane of the present invention, it is preferable the lower limit of the film thickness is 10 µm; 20 µm is more preferable; and 30 µm is still more preferable, and it is preferable that the upper limit is 1,000 µm; 500 µm is more preferable; and 100 µm is still more preferable.

If the film thickness is too large, adequate moisture permeability may not be obtained, and if the film thickness is too small, it is likely that a pinhole is formed or the film readily undergoes blocking and becomes difficult to handle.

<2-13. Molecular Weight>

The molecular weight of the polyurethane of the present invention is appropriately adjusted according to usage and is not particularly limited, but the weight average molecular weight (Mw) in terms of polystyrene as measured by GPC is preferably from 50,000 to 500,000, more preferably from 100,000 to 300,000. If Mw is less than the lower limit above, sufficient strength or hardness may not be obtained, and if it exceeds the upper limit above, the handling property such as processability tends to be impaired.

<2-14. Oleic Acid Resistance>

In the polyurethane of the present invention, in evaluation, for example, by the method described later in the paragraph of Examples, it is preferable that the change ratio (%) of the weight of a polyurethane specimen after immersion in oleic acid to the weight of the polyurethane specimen before immersion in oleic acid is 80% or less; 60% or less is more preferable; 50% or less is still more preferable; 45% or less is particularly preferable; and 40% or less is most preferable.

If this weight change ratio exceeds the upper limit above, adequate oleic acid resistance may not be obtained.

<2-15. Ethanol Resistance>

In the polyurethane of the present invention, in evaluation, for example, by the method described later in the paragraph of Examples, it is preferable that the change ratio (%) of the weight of a polyurethane specimen after immersion in ethanol to the weight of the polyurethane specimen before immersion in ethanol is 25% or less; 23% or less is more preferable; 21% or less is still more preferable; 20% or less is particularly preferable; and 19% or less is most preferable.

If this weight change ratio exceeds the upper limit above, adequate ethanol resistance may not be obtained.

<2-16. Ethyl Acetate Resistance>

In the polyurethane of the present invention, in evaluation, for example, by the method described later in the paragraph of Examples, it is preferable that the change ratio (%) of the weight of a polyurethane specimen after immersion in ethyl acetate to the weight of the polyurethane specimen before immersion in ethyl acetate is 250% or less; 230% or less is more preferable; and 200% or less is still more preferable.

If this weight change ratio exceeds the upper limit above, desired ethyl acetate resistance may not be obtained.

<2-17. Tensile Elongation at Break>

In the polyurethane of the present invention, it is preferable that the lower limit of the tensile elongation at break as measured on a strip sample having a width of 10 mm, a length of 100 mm and a thickness of approximately from 50 to 100 µm under the conditions of a chuck-to-chuck distance of 50 mm, a tensile speed of 500 mm/min, a temperature of 23° C. and a relative humidity of 50% is 50%; 100% is more preferable; and 150% is still more preferable, and it is preferable that the upper limit is 900%; 850% is more preferable; and 800% is still more preferable. If the tensile elongation at break is less than the lower limit above, the handling property such as processability tends to be impaired, and if it exceeds the upper limit above, sufficient chemical resistance may not be obtained.

<2-18. 100% Modulus>

In the polyurethane of the present invention, when the polyurethane is obtained by the two-step method of reacting 2 equivalents of 4,4'-dicyclohexylmethane diisocyanate with the polycarbonate diol of the present invention and further performing a chain extension reaction with isophoronediamine, it is preferable that the lower limit of the 100% modulus as measured on a strip sample having a width of 10 mm, a length of 100 mm and a thickness of approximately from 50 to 100 µm under the conditions of a chuck-to-chuck distance of 50 mm, a tensile speed of 500 mm/min, a temperature of 23° C. and a relative humidity of 50% is 0.1 MPa; 0.5 MPa is more preferable; and 1 MPa is still preferable, and it is preferable that the upper limit is 20 MPa; 10 MPa is more preferable; and 6 MPa is still preferable. If the 100% modulus is less than the lower limit above, the chemical resistance may be inadequate, and if it exceeds the upper limit above, the flexibility may be insufficient or the handling property such as processability tends to be impaired. Furthermore, it is preferable that the 100% modulus of the specific polyurethane at −10° C. is 0.5 MPa; 1.0 MPa is more preferable; 1.5 MPa is still more preferable; and 2.0 MPa is particularly preferable. It is preferable that the upper limit is 13.0 MPa; 12.5 MPa is more preferable; 12.0 MPa is still more preferable; 11.5 MPa is particularly preferable; and 10.0 MPa is most preferable. If the 100% modulus at −10° C. is less than the lower limit above, the chemical resistance may be inadequate, and if the 100% modulus at −10° C. exceeds the upper limit above, the flexibility at low temperatures may be insufficient, or the handling property such as processability may be impaired.

<2-19. Low-Temperature Properties>

The polyurethane of the present invention has good low-temperature properties, and the low-temperature properties as used in this application can be evaluated by the tensile elongation at break, the Young's modulus, and the 100% modulus, in a tensile test at a low temperature of, e.g., −10° C. Specifically, the low-temperature properties are flexibility, impact resistance, flex resistance and durability, at low temperatures.

<2-20. Glass Transition Temperature>

In the case where the polyurethane is obtained by the two-step method of reacting 2 equivalents of 4,4'-dicyclohexylmethane diisocyanate with the polycarbonate diol of the present invention and further performing a chain extension reaction with isophoronediamine, it is preferable that the lower limit of the glass transition temperature (Tg) of the specific polyurethane having a weight average molecular weight (Mw) of 130,000 to 210,000 in terms of polystyrene as measured by GPC is −50° C.; −45° C. is more preferable; and −40° C. is still more preferable, and it is preferable that the upper limit is −20° C.; −25° C. is more preferable, and −30° C. is still preferable. If Tg is less than the lower limit above, the chemical resistance may be inadequate, and if it exceeds the upper limit above, the low-temperature properties may be insufficient.

<2-21. Usage>

The polyurethane of the present invention has excellent chemical resistance and good flexibility, heat resistance and weather resistance and therefore, can be widely used for a foam, an elastomer, an elastic fiber, a coating material, a fiber, a pressure-sensitive adhesive, an adhesive, a floor material, a sealant, a medical material, an artificial leather, a synthetic leather, a coating agent, an aqueous polyurethane coating material, an active energy ray-curable resin composition, etc.

Among others, when the polyurethane of the present invention is used for applications such as artificial leather, synthetic leather, aqueous polyurethane, adhesive, elastic fiber, medical material, floor material, coating material and coating agent, because of a good balance among chemical resistance, flexibility, heat resistance and weather resistance, satisfactory characteristic features of high durability, sufficient flexibility and high resistance to physical impact, etc. can be imparted to a portion which is put into contact with human skin or in which a cosmetic preparation or a rubbing alcohol is used. In addition, the polyurethane can also be suitably used for automotive applications requiring heat resistance or outdoor applications requiring weather resistance.

The polyurethane of the present invention can be used for a cast polyurethane elastomer. Specific applications thereof include rolls such as pressure roll, papermaking roll, office machine and pretension roll; a solid tire, caster, etc. of, e.g., a fork lift, an automotive vehicle new tram, a carriage, or a truck; and an industrial product such as conveyor belt idler, guide roll, pulley, steel pipe lining, rubber screen for ore, gears, connection ring, liner, pump impeller, cyclone cone and cyclone liner. In addition, the polyurethane can also be used for a belt of OA device, a paper feed roll, a cleaning blade for copier, a snow plow, a toothed belt, a surf roller, etc.

The polyurethane of the present invention is also applied to usage as a thermoplastic elastomer. For example, the polyurethane can be used for tubes or hoses in a pneumatic instrument employed in the food and medical fields, a coating apparatus, an analytical instrument, a physicochemical instrument, a metering pump, a water treatment apparatus, an industrial robot, etc., and for a spiral tube, a fire hose, etc. The polyurethane is also used as a belt such as round belt, V-belt and flat belt, in various transmission mechanisms, spinning machines, packaging machines, printing machines, etc. Furthermore, the polyurethane can also be used for a footwear heel top, a shoe sole, a machine component such as coupling, packing, ball joint, bush, gear and roll, sporting goods, leisure goods, a watchband, etc. The automotive parts include an oil stopper, a gearbox, a spacer, a chassis part, an interior trim, a tire chain substitute, etc. In addition, the polyurethane can be used for a film such as keyboard film and automotive film, a curl code, a cable sheath, a bellows, a conveying belt, a flexible container, a binder, a synthetic leather, a dipping product, an adhesive, etc.

The polyurethane of the present invention can also be applied to usage as a solvent-based two-component paint and can be applied to a wood product such as musical instrument, family altar, furniture, decorative plywood and sport gear. The polyurethane can also be used as a tar epoxy urethane for automotive repair.

The polyurethane of the present invention can be used as a component of a moisture-curable one-component paint, a blocked isocyanate-based solvent paint, an alkyd resin paint, a urethane-modified synthetic resin paint, an ultraviolet-curable paint, an aqueous urethane paint, etc. and can be applied, for example, to a coating material for plastic bumper, a strippable paint, a coating agent for magnetic tape, an overprint varnish of floor tile, floor material, paper, wood-grain printing film, etc., a wood varnish, a coil coating for high processing, an optical fiber protective coating, a solder resist, a topcoat for metal printing, a basecoat for vapor deposition, and a white coating for food cans.

The polyurethane of the present invention can be applied, as a pressure-sensitive adhesive or an adhesive, to food packaging, shoes, footwear, a magnetic tape binder, decorative paper, wood, a structural member, etc. and can also be used as a component of a low-temperature adhesive or a hot melt.

The polyurethane of the present invention can be used, as a binder, for a magnetic recording medium, an ink, a casting, a fired brick, a grout, a microcapsule, a granular fertilizer, a granular agrochemical, a polymer cement mortar, a resin mortar, a rubber chip binder, a recycled foam, a glass fiber sizing, etc.

The polyurethane of the present invention can be used, as a component of a fiber-processing agent, for shrink proofing, crease proofing, water repellent finishing, etc.

In the case of using the polyurethane of the present invention as an elastic fiber, the method for fiberization thereof can be conducted without any particular limitation as long as it is a method capable of spinning. For example, a melt spinning method where the polyurethane is once pelletized, then melt, and spun by directly passing the melt through a spinneret may be employed. In the case of obtaining an elastic fiber by melt spinning from the polyurethane of the present invention, it is preferable that the spinning temperature is 250° C. or less; and 200 to 235° C. is more preferable.

The polyurethane elastic fiber of the present invention may be used directly as a bare fiber or can be coated with another fiber and used as a coated fiber. The another fiber includes conventionally known fibers such as polyamide fiber, wool, cotton and polyester fiber, and among others, a polyester fiber is preferably used in the present invention. In addition, the polyurethane elastic fiber of the present invention may contain a disperse dye of dyeing type.

The polyurethane of the present invention can be used, as a sealant/caulking, for a concrete wall, a trigger joint, a sash periphery, a wall-type PC (Precast Concrete) joint, an ALC (Autoclaved Light-weight Concrete) joint, a joint of boards, a composite glass sealant, a heat-insulating sash sealant, an automotive sealant, etc.

The polyurethane of the present invention can be used as a medical material and can be used, as a blood compatible material, for a tube, a catheter, an artificial heart, an artificial blood vessel, an artificial valve, etc. or, as a disposable material, for a catheter, a tube, a bag, a surgical glove, an artificial kidney potting material, etc.

The polyurethane of the present invention can be used, by modifying the terminal, as a raw material for an UV curable paint, an electron beam curable paint, a photosensitive resin composition for flexographic printing plate, a photocurable coating material composition for optical fiber, etc.

<2-22. Urethane (Meth)Acrylate-Based Oligomer>

A urethane (meth)acrylate-based oligomer can be produced by subjecting a polyisocyanate and a hydroxyalkyl (meth)acrylate to an addition reaction by using the polycarbonate diol of the present invention. In the case where the polyol as another raw material compound, a chain extender, etc. are used in combination, the urethane (meth)acrylate-based oligomer can be produced by further subjecting such other raw material compounds to an addition reaction to the polyisocyanate.

In the present invention, the "(meth)acryl" referred to, as in (meth)acrylate or (meth)acrylic acid, means acryl and/or methacryl.

At this time, the charge ratio of respective raw material compounds is substantially equal to or the same as that in the composition of the objective urethane (meth)acrylate-based oligomer.

Usually, the amount of all isocyanate groups in the urethane (meth)acrylate-based oligomer and the amount of all functional groups reacting with the isocyanate group, such as hydroxyl group and amino group, are theoretically equimolar.

At the time of producing the urethane (meth)acrylate-based oligomer, it is usual that the amount of the hydroxyalkyl (meth)acrylate used is 10 mol % or more; 15 mol % or more is preferable; and 25 mol % or more is more preferable, and 70 mol % or less is usual; and 50 mol % or less is preferable, relative to the total amount used of the hydroxyalkyl (meth)acrylate, the polycarbonate diol, the polyol as another raw material used, if desired, and a compound containing a functional group reacting with isocyanate, such as chain extender. The molecular weight of the obtained urethane (meth)acrylate-based oligomer can be controlled according to the ratio above. When the ratio of the hydroxyalkyl (meth)acrylate is large, the molecular weight of the urethane (meth)acrylate-based oligomer tends to be small, and when the ratio is small, the molecular weight tends to be large.

It is preferable that the amount of the polycarbonate diol used is 25 mol % or more; 50 mol % or more is more preferable, and 70 mol % or more is still more preferable, relative to the total amount used of the polycarbonate diol and the polyol. When the amount of the polycarbonate diol used is not less than the lower limit above, the hardness and contamination resistance of the cured product obtained tend to be improved advantageously.

In addition, it is preferable that the amount of the polycarbonate diol used is 10% by mass or more; 30% by mass or more is more is preferable; 50% by mass or more is still more preferable; and 70% by mass or more is particularly preferable, relative to the total amount used of the polycarbonate diol and the polyol. When the amount of the polycarbonate diol used is not less than the lower limit above, advantageously, it is likely that the viscosity of the obtained composition is reduced, improving the workability, and the mechanical strength and hardness or abrasion resistance of the cured product obtained are enhanced.

Furthermore, it is preferable that the amount of the polycarbonate diol used is 25 mol % or more; 50 mol % or more is more preferable; and 70 mol % or more is still more preferable, relative to the total amount used of the polycarbonate diol and the polyol. When the amount of the polycarbonate diol used is not less than the lower limit above, advantageously, the elongation and weather resistance of the cured product obtained tend to be improved.

In the case of using a chain extender, it is preferable that the amount of the polyol used is preferably 70 mol % or more; 80 mol % or more is more preferable; 90 mol % or more is still more preferable, and 95 mol % or more is particularly preferable, relative to the total amount used of the polycarbonate diol, the polyol and the chain extender. When the amount of the polyol is not less than the lower limit above, advantageously, the solution stability tends to be enhanced.

At the time of production of the urethane (meth)acrylate-based oligomer, a solvent can be used for the purpose of adjusting the viscosity. One solvent may be used alone, or two or more solvents may be mixed and used. As the solvent, any known solvent may be used. Preferable solvents include toluene, xylene, ethyl acetate, butyl acetate, cyclohexanone, methyl ethyl ketone, methyl isobutyl ketone, etc. The solvent can be used usually in an amount of less than 300 parts by mass per 100 parts by mass of the solid content in the reaction system.

At the time of production of the urethane (meth)acrylate-based oligomer, it is preferable that the total content of the urethane (meth)acrylate-based oligomer produced and raw material compounds therefor is 20% by mass or more; and 40% by mass or more is more preferable, relative to the total amount of the reaction system. The upper limit of the total content is 100% by mass. When the total content of the urethane (meth)acrylate-based oligomer and raw material compounds therefor is 20% by mass or more, advantageously, it is likely that the reaction speed is increased and the production efficiency is enhanced.

At the time of production of the urethane (meth)acrylate-based oligomer, an addition reaction catalyst can be used. The addition reaction catalyst includes, for example, dibutyltin laurate, dibutyltin dioctoate, dioctyltin dilaurate, and dioctyltin dioctoate. One addition reaction catalyst may be used alone, or two or more addition reaction catalysts may be mixed and used. Among these, the addition reaction catalyst is preferably dioctyltin dilaurate in view of environmental adaptability, catalytic activity and storage stability.

As for the amount used of the addition reaction catalyst relative to the total content of the urethane (meth)acrylate-based oligomer produced and raw material compounds therefor, it is usual that the upper limit is 1,000 ppm by weight; and 500 ppm by weight is preferable, and it is usual that the lower limit is 10 ppm by weight; and 30 ppm by weight is preferable.

At the time of production of the urethane (meth)acrylate-based oligomer, in the case of containing a (meth)acryloyl group in the reaction system, a polymerization inhibitor may be used in combination. The polymerization inhibitor includes, for example, phenols such as hydroquinone, methylhydroquinone, hydroquinone monoethyl ether and dibutylhydroxytoluene, amines such as phenothiazine and diphenylamine, a copper salt such as copper dibutyldithiocarbamate, a manganese salt such as manganese acetate, a nitro compound, and a nitroso compound. One polymerization inhibitor may be used alone, or two or more polymerization inhibitors may be mixed and used. Among these polymerization inhibitors, phenols are preferred.

As for the amount used of the polymerization inhibitor relative to the total content of the urethane (meth)acrylate-based oligomer produced and raw material compounds therefor, it is usual that the upper limit is 3,000 ppm by weight; 1,000 ppm by weight is preferable; and 500 ppm by weight is more preferable, and it is usual that the lower limit is 50 ppm by weight; and 100 ppm by weight is preferable.

At the time of production of the urethane (meth)acrylate-based oligomer, it is usual that the reaction temperature is 20° C. or more; 40° C. or more is preferable; and 60° C. or more is more preferable. When the reaction temperature is 20° C. or more, advantageously, it is likely that the reaction rate is increased and the production efficiency is enhanced. In addition, the reaction temperature is usually 120° C. or less, preferably 100° C. or less. When the reaction temperature is 120° C. or less, advantageously, a side reaction such as allophanation reaction is less likely to occur. In the case of containing a solvent in the reaction system, the reaction temperature is preferably not more than the boiling point of the solvent, and in the case of containing (meth)acrylate, from the viewpoint of preventing reaction of a (meth)

acryloyl group, the reaction temperature is preferably 70° C. or less. The reaction time is usually on the order of 5 to 20 hours.

It is preferable that the number average molecular weight of the thus-obtained urethane (meth)acrylate-based oligomer is 500 or more; and 1,000 or more is particularly preferable, and 10,000 or less is preferable; 5,000 or less is particularly preferable; and 3,000 or less still more preferable. When the number average molecular weight of the urethane (meth)acrylate-based oligomer is not less than the lower limit above, the three-dimensional processing suitability of the cured film obtained advantageously tends to be improved to provide an excellent balance between the three-dimensional processing suitability and the contamination resistance. When the number average molecular weight of the urethane (meth)acrylate-based oligomer is not more than the upper limit above, the contamination resistance of the cured film obtained from the composition advantageously tends to be improved to provide an excellent balance between the three-dimensional processing suitability and the contamination resistance. This is presumed to result because the three-dimensional processing suitability and the contamination resistance are dependent on the distance between crosslinking points in a network structure and when the distance is long, a soft and stretchy structure develops to provide excellent three-dimensional processing suitability, whereas when the distance is short, the network structure comes to take on a rigid structure to provide excellent contamination resistance.

<2-23. Polyester-Based Elastomer>

Furthermore, the polycarbonate diol of the present invention can be used as a polyester-based elastomer. The polyester-based elastomer is a copolymer consisting of a hard segment mainly composed of an aromatic polyester and a soft segment mainly composed of an aliphatic polyether, an aliphatic polyester or an aliphatic polycarbonate. When the polycarbonate diol of the present invention is used as a constituent component of the soft segment, physical properties such as heat resistance and water resistance are excellent, compared with the case using an aliphatic polyether or an aliphatic polyester. Even in comparison with a conventional polycarbonate diol, a polycarbonate ester elastomer having fluidity during melting, i.e., a melt flow rate suitable for blow molding and extrusion molding, and being excellent in the balance with the mechanical strength and other physical properties is obtained and can be suitably used as various molding materials including a fiber, a film and a sheet, for example, as a molding material for an elastic fiber, a boot, a gear, a tube, a packing, etc. Specifically, the elastomer can be effectively applied to usage requiring heat resistance and durability, such as joint boot of automobiles, home electric appliance parts, etc., and wire coating material.

<2-24. Active Energy Ray-Curable Polymer Composition>

The active energy ray-curable polymer composition of the present invention containing the above-described urethane (meth)acrylate-based oligomer is described below.

In the active energy ray-curable polymer composition of the present invention, the calculated molecular weight between network crosslinking points of the composition is preferably from 500 to 10,000.

In the description of the present invention, the calculated molecular weight between network crosslinking points of the composition indicates an average value of the molecular weight between active energy ray reactive groups (hereinafter, sometimes referred as "crosslinking point") forming a network structure in the entire composition. The calculated molecular weight between network crosslinking points is correlated with the network area at the time of formation of a network structure and as the calculated molecular weight between network crosslinking points is larger, the crosslinking density decreases. In the reaction by active energy ray curing, a linear polymer is formed when a compound having only one active energy ray reactive group (hereinafter, sometimes referred as "monofunctional compound") is reacted, and on the other hand, a network structure is formed when a compound having two or more active energy ray reactive groups (hereinafter, sometimes referred to "polyfunctional compound") is reacted.

Accordingly, an active energy ray reactive group contained in a polyfunctional compound is a crosslinking point, the calculation of calculated molecular weight between network crosslinking points is centered on a polyfunctional compound having a crosslinking point, and the calculated molecular weight between network crosslinking points is calculated by treating a monofunctional compound as effective in extending the molecular weight between crosslinking points contained in a polyfunctional compound. In addition, the calculation of calculated molecular weight between network crosslinking points is performed on the assumption that all active energy ray reactive groups have the same reactivity and all active energy ray reactive groups undergo a reaction by the irradiation with an active energy ray.

In a composition of a single polyfunctional compound system, where only one polyfunctional compound undergoes a reaction, the calculated molecular weight between network crosslinking points is two times the average molecular weight per one active energy ray reactive group contained in a polyfunctional compound. For example, the calculated molecular weight between network crosslinking points is $(1,000/2) \times 2 = 1,000$ in the case of a bifunctional compound having a molecular weight of 1,000 and is $(300/3) \times 2 = 200$ in the case of a trifunctional compound having a molecular weight of 300.

In a composition of a polyfunctional compound mixture system, where a plurality of polyfunctional compounds undergo a reaction, the calculated molecular weight between network crosslinking points of the composition is an average value of respective calculated molecular weights between network crosslinking points of single systems for the number of all active energy ray reactive groups contained in the composition. For example, in a composition composed of a mixture containing 4 mol of a bifunctional compound having a molecular weight of 1,000 and 4 mol of a trifunctional compound having a molecular weight of 300, the number of all active energy ray reactive groups in the composition is $2 \times 4 + 3 \times 4 = 20$, and the calculated molecular weight between network crosslinking points of the composition is $\{(1,000/2) \times 8 + (300/3) \times 12\} \times 2/20 = 520$.

In the case of containing a monofunctional compound in the composition, assuming the reaction is performed such that an equimolar amount of a monofunctional compound is linked to each active energy ray reactive group (i.e., crosslinking point) of the polyfunctional compounds and a monofunctional compound is located at the center of a molecular chain formed by linking the monofunctional compound to a crosslinking point, computationally, the increase in the molecular chain length achieved by a monofunctional compound at one crosslinking point is half of a value obtained by dividing the total molecular weight of monofunctional compounds by the number of all active energy ray reactive groups of polyfunctional compounds in the composition. Here, since the calculated molecular weight between network crosslinking points is considered to be two times the average molecular weight per one crosslinking point, the length extended by a monofunctional compound, relative to the calculated molecular weight between network crosslinking points calculated in a polyfunctional compound, is a value obtained by dividing the total molecular weight of monofunctional compounds by the number of all active energy ray reactive groups of polyfunctional compounds in the composition.

For example, in a composition composed of a mixture containing 40 mol of a monofunctional compound having a molecular weight 100 and 4 mol of a bifunctional compound having a molecular weight 1,000, the number of active energy ray reactive groups of the polyfunctional compound is 2×4=8, and in the calculated molecular weight between network crosslinking points, the length extended by the monofunctional compound is 100×40/8=500. That is, the calculated molecular weight between network crosslinking points of the composition is 1,000+500=1,500.

Based on the above, in a mixture containing $M_A$ mol of a monofunctional compound having a molecular weight of $W_A$, $M_B$ mol of an $f_B$-functional compound having a molecular weight of $W_B$, and $M_C$ mol of an $f_C$-functional compound having a molecular weight of $W_C$, the calculated molecular weight between network crosslinking points of the composition can be expressed by the following formula:

$$\frac{\left(\frac{W_A M_A}{f_B M_B + f_C M_C} + \frac{2W_B}{f_B}\right) \times f_B M_B + \left(\frac{W_A M_A}{f_B M_B + f_C M_C} + \frac{2W_C}{f_C}\right) \times f_C M_C}{f_B M_B + f_C M_C} = \frac{W_A M_A + 2W_B M_B + 2W_C M_C}{f_B M_B + f_C M_C}$$ [Math. 1]

It is preferable that the calculated molecular weight between network crosslinking points of the active energy ray-curable polymer composition of the present invention, which is calculated as above, is 500 or more; 800 or more is more preferable; and 1,000 or more is still more preferable, and 10,000 or less is preferable; 8,000 or less is more preferable; 6,000 or less is still preferable; 4,000 or less is yet still more preferable; and 3,000 or less is particularly preferable.

When the calculated molecular weight between network crosslinking points is 10,000 or less, the contamination resistance of the cured film obtained from the composition advantageously tends to be improved to provide an excellent balance between three-dimensional processing suitability and contamination resistance. When the calculated molecular weight between network crosslinking points is 500 or more, the three-dimensional processing suitability of the cured film obtained advantageously tends to be improved to provide an excellent balance between three-dimensional processing suitability and contamination resistance. This is presumed to result because the three-dimensional processing suitability and the contamination resistance are dependent on the distance between crosslinking points in a network structure and when the distance is long, a soft and stretchy structure develops to provide excellent three-dimensional processing suitability, whereas when the distance is short, the network structure takes on a rigid structure to provide excellent contamination resistance.

The active energy ray-curable polymer composition of the present invention may further contain components other than the urethane (meth)acrylate-based oligomer. Other components include, for example, an active energy ray reactive monomer, an active energy ray-curable oligomer, a polymerization initiator, a photosensitizer, an additive, and a solvent.

In the active energy ray-curable polymer composition of the present invention, it is preferable that the content of the urethane (meth)acrylate-based oligomer is 40% by mass or more; and 60% by mass or more is more preferable, relative to the total amount of active energy ray reactive components including the urethane (meth)acrylate-based oligomer. The upper limit of this content is 100% by mass. When the content of the urethane (meth)acrylate oligomer is 40% by mass or more, the curability is improved and when a cured product is formed, the three-dimensional processing suitability advantageously tends to be enhanced without an excessive increase in the mechanical strength.

In the active energy ray-curable polymer composition of the present invention, the content of the urethane (meth)acrylate-based oligomer is preferably larger in view of elongation and film forming property and, on the other hand, is preferably smaller in view of reducing the viscosity. From these viewpoints, the content of the urethane (meth)acrylate-based oligomer is preferably 50% by mass or more, more preferably 70% by mass or more, relative to the total amount of all components including other components in addition to the above-described active energy ray reactive components. The upper limit value of the content of the urethane (meth)acrylate-based oligomer is 100% by mass, and the content is preferably not more than that.

In the active energy ray-curable polymer composition of the present invention, it is preferable that the total content of the active energy ray reactive components including the urethane (meth)acrylate-based oligomer is 60% by mass or more; 80% by mass or more is more preferable; 90% by mass or more is still more preferable; and 95% by mass or more is particularly preferable, relative to the total amount of the composition, because, for example, the curing rate and surface curability as a composition is excellent and tack does not remain. The upper limit of the content is 100% by mass.

As the active energy ray reactive monomer, any known active energy ray reactive monomer can be used. Such an active energy ray reactive monomer is used with an aim to, for example, adjust the hydrophilicity/hydrophobicity of the urethane (meth)acrylate-based oligomer and the physical properties such as hardness and elongation of a cured product when the obtained composition is formed into a cured product. As for the active energy ray reactive monomer, one monomer may be used alone, or two or more monomers may be mixed and used.

Such an active energy ray reactive monomer includes, for example, vinyl ethers, (meth)acrylamides, and (meth)acrylates. Specifically, the monomer includes, for example, aromatic vinyl-based monomers such as styrene, α-methylstyrene, α-chlorostyrene, vinyltoluene and divinylbenzene; vinyl ester monomers such as vinyl acetate, vinyl butyrate, N-vinylformamide, N-vinylacetamide, N-vinyl-2-pyrrolidone, N-vinylcaprolactam and divinyl adipate; vinyl ethers such as ethyl vinyl ether and phenyl vinyl ether; allyl compounds such as diallyl phthalate, trimethylolpropane diallyl ether and allyl glycidyl ether; (meth)acrylamides such as (meth)acrylamide, N,N-dimethylacrylamide, N,N-dimethylmethacrylamide, N-methylol(meth)acrylamide, N-methoxymethyl(meth)acrylamide, N-butoxymethyl (meth)acrylamide, N-tert-butyl(meth)acrylamide, (meth)acryloylmorpholine and methylenebis(meth)acrylamide; a monofunctional (meth)acrylate such as (meth)acrylic acid, methyl (meth)acrylate, ethyl (meth)acrylate, propyl (meth) acrylate, n-butyl (meth)acrylate, i-butyl (meth)acrylate, tert-butyl (meth)acrylate, hexyl (meth)acrylate, 2-ethylhexyl (meth)acrylate, lauryl (meth)acrylate, stearyl (meth)acrylate, tetrahydrofurfuryl (meth)acrylate, morpholyl (meth) acrylate, 2-hydroxyethyl (meth)acrylate, 2-hydroxypropyl (meth)acrylate, 4-hydroxybutyl (meth)acrylate, glycidyl (meth)acrylate, dimethylaminoethyl (meth)acrylate, diethylaminoethyl (meth)acrylate, benzyl (meth)acrylate, cyclohexyl (meth)acrylate, phenoxyethyl (meth)acrylate, tricyclodecane (meth)acrylate, dicyclopentenyl (meth)acrylate, dicyclopentenyloxyethyl (meth)acrylate, dicyclopentanyl (meth)acrylate, allyl (meth)acrylate, 2-ethoxyethyl (meth) acrylate, isobornyl (meth)acrylate and phenyl (meth)acrylate; and a polyfunctional (meth)acrylate such as ethylene glycol di(meth)acrylate, diethylene glycol di(meth)acrylate, triethylene glycol di(meth)acrylate, tetraethylene glycol di(meth)acrylate, polyethylene glycol di(meth)acrylate (n=from 5 to 14), propylene glycol di(meth)acrylate, dipropylene glycol di(meth)acrylate, tripropylene glycol di(meth) acrylate, tetrapropylene glycol di(meth)acrylate, polypropylene glycol di(meth)acrylate (n=from 5 to 14), 1,3-butylene glycol di(meth)acrylate, 1,4-butanediol di(meth) acrylate, polybutylene glycol di(meth)acrylate (n=from 3 to 16), poly(l-methyl butylene glycol) di(meth)acrylate (n=from 5 to 20), 1,6-hexanediol di(meth)acrylate, 1,9-nonanediol di(meth)acrylate, neopentyl glycol di(meth) acrylate, hydroxypivalic acid neopentyl glycol di(meth) acrylic acid ester, dicyclopentanediol di(meth)acrylate, tricyclodecane di(meth)acrylate, trimethylolpropane tri (meth)acrylate, pentaerythritol tri(meth)acrylate, pentaerythritol tetra(meth)acrylate, ditrimethylolpropane tetra (meth)acrylate, dipentaerythritol tetra(meth)acrylate, dipentaerythritol penta(meth)acrylate, dipentaerythritol hexa(meth)acrylate, trimethylolpropane trioxyethyl (meth)acrylate, trimethylolpropane trioxypropyl (meth)acrylate, trimethylolpropane polyoxyethyl (meth)acrylate, trimethylolpropane polyoxypropyl (meth)acrylate, tris(2-hydroxyethyl) isocyanurate tri(meth)acrylate, tris(2-hydroxyethyl) isocyanurate di(meth)acrylate, ethylene oxide-added bisphenol A di(meth)acrylate, ethylene oxide-added bisphenol F di(meth)acrylate, propylene oxide-added bisphenol A di(meth)acrylate, propylene oxide-added bisphenol F di(meth)acrylate, tricyclodecanedimethanol di(meth) acrylate, bisphenol A epoxy di(meth)acrylate, and bisphenol F epoxy di(meth)acrylate.

Among these, a monofunctional (meth)acrylate having a ring structure in the molecule, such as (meth)acryloylmorpholine, tetrahydrofurfuryl (meth)acrylate, benzyl (meth) acrylate, cyclohexyl (meth)acrylate, trimethylcyclohexyl (meth)acrylate, phenoxyethyl (meth)acrylate, tricyclodecane (meth)acrylate, dicyclopentenyl (meth)acrylate, isobornyl (meth)acrylate and (meth)acrylamide, is preferred in the application requiring coating properties, and a polyfunctional (meth)acrylate, such as 1,4-butanediol di(meth)acrylate, 1,6-hexanediol di(meth)acrylate, 1,9-nonanediol di(meth)acrylate, neopentyl glycol di(meth)acrylate, tricyclodecane di(meth)acrylate, trimethylolpropane tri(meth) acrylate, pentaerythritol tri(meth)acrylate, pentaerythritol tetra(meth)acrylate, dipentaerythritol tetra(meth)acrylate, dipentaerythritol penta(meth)acrylate and dipentaerythritol hexa(meth)acrylate, is preferred in the application requiring mechanical strength of the cured product obtained.

In the active energy ray-curable polymer composition of the present invention, from the viewpoint of adjusting the viscosity of the composition and adjusting the physical properties such as hardness and elongation of the cured product obtained, it is preferable that the content of the active energy ray reactive monomer is 50% by mass or less; 30% by mass or less is more preferable; 20% by mass or less is still more preferable; and 10% by mass or less is particularly preferable, relative to the total amount of the composition.

As for the active energy ray curable oligomer, one oligomer may be used alone, or two or more oligomers may be mixed and used. The active energy ray curable oligomer includes an epoxy (meth)acrylate-based oligomer and an acrylic (meth)acrylate oligomer.

In the active energy ray-curable polymer composition of the present invention, from the viewpoint of adjusting the physical properties such as hardness and elongation of the cured product obtained, it is preferable that the content of the active energy ray reactive oligomer is 50% by mass or less; 30% by mass or less is more preferable; 20% by mass or less is still more preferable; and 10% by mass or less is particularly preferable, relative to the total amount of the composition.

The above-described polymerization initiator is used mainly for the purpose of improving the initiation efficiency of polymerization reaction that proceeds by the irradiation with an active energy ray such as ultraviolet ray and electron beam. The polymerization initiator is generally a radical photopolymerization initiator that is a compound having a property of generating a radical by light, and any known radical photopolymerization initiator can be used. One polymerization initiator may be used alone, or two or more polymerization initiators may be mixed and used. Furthermore, a radical photopolymerization initiator and a photosensitizer may be used in combination.

The radical photopolymerization initiator includes, for example, benzophenone, 2,4,6-trimethylbenzophenone, 4,4-bis(diethylamino)benzophenone, 4-phenylbenzophenone, methylorthobenzoyl benzoate, thioxanthone, diethylthioxanthone, isopropylthioxanthone, chlorothioxanthone, 2-ethylanthraquinone, tert-butylanthraquinone, diethoxyacetophenone, 2-hydroxy-2-methyl-1-phenylpropan-1-one, benzyl dimethyl ketal, 1-hydroxycyclohexyl phenyl ketone, benzoin methyl ether, benzoin ethyl ether, benzoin isopropyl ether, benzoin isobutyl ether, methylbenzoyl formate, 2-methyl-1-[4-(methylthio)phenyl]-2-morpholinopropan-1-one, 2,6-dimethylbenzoyldiphenylphosphine oxide, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)phenylphosphine oxide, and 2-hydroxy-1-[4-[4-(2-hydroxy-2-methyl-propionyl)-benzyl]-phenyl]-2-methyl-propan-1-one.

Among these, from the viewpoint that the curing rate is high and the crosslinking density can be sufficiently increased, benzophenone, 2-hydroxy-2-methyl-1-phenylpropan-1-one, 1-hydroxycyclohexyl phenyl ketone, 2,4,6-trimethylbenzoyldiphenylphosphine oxide and 2-hydroxy-1-[4-[4-(2-hydroxy-2-methyl-propionyl)-benzyl]-phenyl]-2-methyl-propan-1-one are preferred, and 1-hydroxycyclohexyl phenyl ketone, 2,4,6-trimethylbenzoyldiphenylphosphine oxide and 2-hydroxy-1-[4-[4-(2-hydroxy-2-methyl-propionyl)-benzyl]-phenyl]-2-methyl-propan-1-one are more preferred.

In the case where a compound having a cationic polymerizable group such as epoxy group is contained together with a radical polymerizable group in the active energy ray-curable polymer composition, a cationic photopolymerization initiator may be contained as the polymerization initiator together with the above-described radical photopolymerization initiator. As the cationic photopolymerization initiator, any known initiator may be used as well.

In the active energy ray-curable polymer composition of the present invention, it is preferable that the content of the polymerization initiator is 10 parts by mass or less; and 5 parts by mass or less is more preferable, per 100 parts by mass of the total of the active energy ray reactive components. When the content of the photopolymerization initiator is 10 parts by mass or less, advantageously, reduction in the mechanical strength due to a decomposed initiator is less likely to occur.

The photosensitizer may be used for the same purpose as the polymerization initiator. One photosensitizer may be used alone, or two or more photosensitizers may be mixed and used. As the photosensitizer, any known photosensitizer can be used as long as the effects of the present invention are obtained. Such a photosensitizer includes, for example, ethanolamine, diethanolamine, triethanolamine, N-methyldiethanolamine, methyl 4-dimethylaminobenzoate, ethyl 4-dimethylaminobenzoate, amyl 4-dimethylaminobenzoate, and 4-dimethylaminoacetophenone.

In the active energy ray-curable polymer composition of the present invention, it is preferable that the content of the photosensitizer is 10 parts by mass or less; and 5 parts by mass or less is more preferable, per 100 parts by mass of the total of the active energy ray reactive components. When the content of the photosensitizer is 10 parts by mass or less, advantageously, reduction in the mechanical strength due to a decreased crosslinking density is less likely to occur.

The additive is arbitrary, and various materials added to a composition used for the same applications can be used as the additive. One additive may be used alone, or two or more additives may be mixed and used. Such an additive includes, for example, fillers such as glass fiber, glass bead, silica, alumina, calcium carbonate, isinglass, zinc oxide, titanium oxide, mica, talc, kaolin, metal oxide, metal fiber, iron, lead and metal powder; carbon materials such as carbon fiber, carbon black, graphite, carbon nanotube and fullerenes, e.g., C60 (fillers and carbon materials are sometimes collectively called "inorganic component"); modifying agents such as antioxidant, thermal stabilizer, ultraviolet absorber, HALS (hindered amine light stabilizer), fingerprint-resisting agent, surface hydrophilizing agent, antistatic agent, slippage imparting agent, plasticizer, release agent, antifoaming agent, leveling agent, antisettling agent, surfactant, thixotropy imparting agent, lubricant, flame retardant, flame retardant aid, polymerization inhibitor, bulking agent and silane coupling agent; coloring agents such as pigment, dye and hue adjuster; and curing agents, catalysts and curing accelerators which are necessary for the synthesis of a monomer and/or its oligomer or an inorganic component.

In the active energy ray-curable polymer composition of the present invention, it is preferable that the content of the additive above is 10 parts by mass or less; and 5 parts by mass or less is more preferable, per 100 parts by mass of the total of the active energy ray reactive components. When the content of the additive is 10 parts by mass or less, advantageously, reduction in the mechanical strength due to a decreased crosslinking density is less likely to occur.

The solvent above can be used, for example, with an aim to adjust the viscosity of the active energy ray-curable polymer composition of the present invention according to the coating method for forming a coating film of the active energy ray-curable polymer composition of the present invention. One solvent may be used alone, or two or more solvents may be mixed and used. As the solvent, any known solvent can be used as long as the effects of the present invention are obtained. Preferable solvents include toluene, xylene, ethyl acetate, butyl acetate, isopropanol, isobutanol, cyclohexane, methyl ethyl ketone, and methyl isobutyl ketone. The solvent can be used usually in an amount of less than 200 parts by mass per 100 parts by mass of the solid content of the active energy ray-curable polymer composition.

The method for incorporating an optional component, e.g., the above-described additive, into the active energy ray-curable polymer composition of the present invention is not particularly limited and includes conventionally known mixing and dispersion methods, etc. In order to more unfailingly disperse the optional component, a dispersion treatment is preferably performed using a disperser. Specifically, the method includes, for example, a method of performing the treatment by using a twin roll, a triple roll, a bead mill, a ball mill, a sand mill, a pebble mill, a trommel mill, a sand grinder, a Szegvari attritor, a planetary agitator, a high-speed impeller disperser, a high-speed stone mill, a high-speed impact mill, a kneader, a homogenizer, an ultrasonic disperser, etc.

Although the viscosity of the active energy ray-curable polymer composition of the present invention can be appropriately adjusted according to usage, use mode, etc. of the composition, in view of handling property, coatability, moldability, three-dimensional formability, etc., it is preferable that the viscosity with an E-type viscometer (rotor 1° 34'×R24) at 25° C. is 10 mPa·s or more; and 100 mPa·s or more is more preferable, and on the other hand, 100,000 mPa·s or less is preferable; and 50,000 mPa·s or less is more preferable. The viscosity of the active energy ray-curable polymer composition can be adjusted, for example, by the content of the urethane (meth)acrylate-based oligomer of the present invention or the type, blending ratio, etc. of the optional component.

As the method for coating the active energy ray-curable polymer composition of the present invention, a known method such as bar coater method, applicator method, curtain flow coater method, roll coater method, spray method, gravure coater method, comma coater method, reverse roll coater method, lip coater method, die coater method, slot die coater method, air knife coater method and dip coater method can be applied, and among these, a bar coater method and a gravure coater method are preferred.

<2-25. Cured Film and Laminate>

The active energy ray-curable polymer composition of the present invention can be formed into a cured film by irradiating the composition with an active energy ray.

The active energy ray that can be used when curing the composition includes infrared ray, visible ray, ultraviolet ray, X-ray, electron beam, α-ray, β-ray, γ-ray, etc. In view of equipment cost and productivity, an electron beam or an ultraviolet ray is preferably utilized. As the light source, an electron beam irradiation apparatus, an ultrahigh pressure mercury lamp, a high pressure mercury lamp, a medium pressure mercury lamp, a low pressure mercury lamp, a metal halide lamp, an Ar laser, a He—Cd laser, a solid-state laser, a xenon lamp, a high-frequency induction mercury lamp, sun light, etc. are suited.

The irradiation dose of the active energy ray may be appropriately selected according to the kind of the active energy ray, and, for example, in the case of curing the composition by electron beam irradiation, the irradiation dose is preferably from 1 to 10 Mrad. In the case of ultraviolet ray irradiation, the irradiation dose is preferably from 50 to 1,000 mJ/cm$^2$. The atmosphere during curing may be air or an inert gas such as nitrogen and argon. In addition, the irradiation may also be applied in a closed space between a film or glass and a metal mold.

Although the thickness of the cured film may be appropriately determined according to the intended use, it is preferable that the lower limit is 1 µm; 3 µm is more preferable; and 5 µm is particularly preferable, and it is preferable that the upper limit is 200 µm; 100 µm is more preferable; and 50 µm is particularly preferable. When the film thickness is 1 µm or more, the design effect and functionality after three-dimensional processing are successfully developed, and on the other hand, when the film thickness is 200 µm or less, advantageously, the internal curability and three-dimensional processing suitability are good. At the time of use in industry, it is preferable that the lower limit of the thickness of the cured film is 1 µm, and it is preferable that the upper limit is 100 µm; 50 µm is more preferable; 20 µm is particularly preferable; and 10 µm is most preferable.

A laminate having, on a base material, a layer composed of the cured film above can be obtained.

The laminate is not particularly limited as long as it has a layer composed of the cured film, and the laminate may have a layer other than the base material and the cured film, between the base material and the cured film or on the outer side thereof. In addition, the laminate may have a plurality of base material or cured film layers.

As the method for obtaining a laminate having a plurality of cured film layers, a known method, for example, a method where all layers are stacked in the uncured state and then cured with an active energy ray, a method where after a lower layer is cured or semi-cured with an active energy ray, an upper layer is coated thereon and the stack is again cured with an active energy ray, or a method where each layer is coated on a release film or a base film and the layers are laminated together in the uncured or semi-cured state, can be applied. From the viewpoint of increasing the adherence between layers, a method of stacking layers in the uncured state and then curing the stack with an active energy ray is preferred. As the method for stacking layers in the uncured state, a known method, such as sequential coating of applying a lower layer and then applying and stacking an upper layer thereon, and simultaneous multilayer coating of simultaneously applying and stacking two or more layers from a multi-slit, can be applied, but the present invention is not limited thereto.

The base material includes articles having various shapes, for example, a plate formed of a metal or various plastics, e.g., a polyester such as polyethylene terephthalate and polybutylene terephthalate, a polyolefin such as polypropylene and polyethylene, a nylon, a polycarbonate, and a (meth)acrylic resin.

The cured film can be a film excellent in the hardness and contamination resistance to general home contamination, such as ink and ethanol, and the laminate using the cured film as a coat on various base materials can be a laminate excellent in the design effect and surface protective property.

The active energy ray-curable polymer composition of the present invention, when taking into account the calculated molecular weight between network crosslinking points, can provide a cured film satisfying the flexibility capable of following deformation during three-dimensional processing, the elongation at break, the mechanical strength, the contamination resistance, and the hardness, all at the same time.

The active energy ray-curable polymer composition of the present invention is also expected to enable a thin-film resin sheet to be simply and easily produced by one-layer coating.

As for the elongation at break of the cured film, the value measured by cutting the cured film into a width of 10 mm and performing a tensile test by means of a Tensilon tensile tester (Tensilon UTM-III-100, manufactured by Orientec, Co. Ltd.) under the conditions of a temperature of 23° C., it is preferable that a tensile speed of 50 mm/min and a chuck-to-chuck distance of 50 mm, is 50% or more; 75% or more is more preferable; 100% or more is still more preferable; and 120% or more is particularly preferable.

The cured film and the laminate can be used as a film substituting for painting and can be effectively applied to, for example, a building interior/exterior material, and various members of automobiles, home appliances, etc.

EXAMPLES

Although the present invention is described more specifically below by referring to Examples and Comparative Examples, the present invention is not limited to these Examples as long as the present invention is within the gist thereof.

The evaluation methods for respective physical values described below are as follows.
[Evaluation Method: Dihydroxy Compound]
<Determination of Aldehyde Derivative Content>

A dihydroxy compound was dissolved in $CDCl_3$ and measured for 400 MHz $^1$H-NMR (AL-400, manufactured by JEOL Ltd.), and by identifying an aldehyde group from signal positions of respective components, the aldehyde derivative content was calculated from the integral value. The aldehyde derivative content was calculated as the weight of the aldehyde derivative. The lower limit value of the aldehyde derivative content relative to the weight of the entire sample is 0.005 wt %.
[Evaluation Method: Polycarbonate Diol]
<Determination of Number Average Molecular Weight, Phenoxy Group Terminal Amount, Phenol Content and Aldehyde Derivative Content>

A polycarbonate diol was dissolved in $CDCl_3$ and measured for 400 MHz $^1$H-NMR (AL-400, manufactured by JEOL Ltd.), and by identifying a phenoxy group, phenol and an aldehyde group from signal positions or respective components, each content and the number average molecular weight were calculated from the integral value. At this time, the detection limit is 100 ppm by weight for the phenol content relative to the weight of the entire sample. The proportion of the phenoxy group is determined from the ratio between an integral value for one proton portion of the phenoxy group and an integral value for one proton portion of the entire terminal, and the detection limit for the phenoxy group is 0.05% relative to the entire terminal. The aldehyde derivative content was calculated as the weight of the aldehyde derivative. The lower limit value of the aldehyde derivative content relative to the weight of the entire sample is 0.005 wt %.
<Measurement of APHA Value>

The APHA value was measured by the comparison with a standard solution prepared by putting polycarbonate diol in a colorimetric tube, in conformity with JIS K0071-1 (1998). A color standard solution 1000 degree (1 mgPt/mL) (produced by Kishida Chemical Co., Ltd.) was used as the reagent.
[Evaluation Method: Polyurethane]
<Measurement of Isocyanate Group Concentration>

After diluting 20 mL of a di-n-butylamine/toluene (weight ratio: 2/25) mixed solution with 90 mL of acetone, the resulting solution was titrated with an aqueous 0.5 N hydrochloric acid solution, and the amount of the aqueous hydrochloric acid solution required for neutralization was measured and taken as a blank value. Subsequently, from 1 to 2 g of the reaction solution was extracted, 20 mL of a di-n-butylamine/toluene mixed solution was added thereto, followed by stirring at room temperature for 30 minutes, the resulting solution was diluted with 90 mL of acetone, similarly to the blank measurement, and titrated with an aqueous 0.5 N hydrochloric acid solution, the amount of the aqueous hydrochloric acid solution required for neutralization was measured, and the amount of the remaining amine was determined. From the volume of the aqueous hydrochloric acid solution required for neutralization, the isocyanate group concentration was determined according to the following formula:

Isocyanate group concentration (wt %)=$A \times 42.02/D$

A: the isocyanate group (mol) contained in the sample used for this measurement $A=(B-C) \times 0.5/1{,}000 \times f$ B: the amount (mL) of aqueous 0.5 N hydrochloric acid solution required in blank measurement
C: the amount (mL) of aqueous 0.5 N hydrochloric acid solution required in this measurement
f: the titer of aqueous hydrochloric acid solution
D: the sample (g) used in this measurement <Measurement of Solution Viscosity>

By providing a rotor of 3°×R14 to VISCOMETER TV-22 (manufactured by Toki Sangyo Co., Ltd.) and using a solution (concentration: 30 wt %) resulting from dissolution of a polyurethane in dimethylformamide, the solution viscosity of a polyurethane solution was measured at 25° C.

<Room-Temperature Tensile Test Method>

In conformity with JIS K6301 (2010), a tensile test of a polyurethane specimen in a strip shape having a width of 10 mm, a length of 100 mm and a thickness of about 50 μm was performed using a tensile tester [product name: "Tensilon UTM-III-100", manufactured by Orientec, Co. Ltd.] under the conditions of a chuck-to-chuck distance of 50 mm, a tensile speed of 500 mm/min and a temperature of 23° C. (relative humidity: 55%), and the stress when the specimen was elongated by 100% and 300% was measured.

<Measurement of Molecular Weight>

As for the molecular weight of polyurethane, a dimethylacetamide solution was prepared to provide a polyurethane concentration of 0.14 wt %, and the number average molecular weight (Mn) and weight average molecular weight (Mw), each in terms of standard polystyrene, were measured using a GPC apparatus [product name: "HLC-8220", manufactured by Tosoh Corporation (column: TskgelGMH-XL×2)].

<Evaluation Method of Oleic Acid Resistance of Polyurethane>

A polyurethane solution was applied to a fluororesin sheet (fluorine tape NITOFLON 900, produced by Nitto Denko Corp., thickness: 0.1 mm) by means of a 9.5-mil applicator, dried at 60° C. for 1 hour and subsequently at 100° C. for 0.5 hours, further dried at 100° C. for 0.5 hours in a vacuum state and at 80° C. for 15 hours, and then left standing still at a constant temperature and a constant humidity of 23° C. and 55% RH for 12 hours or more, and a specimen of 3 cm×3 cm was cut out from the obtained film, charged into a glass vial having a volume of 250 ml and containing 50 ml of a test solvent, and left standing still in a constant temperature bath at 80° C. in a nitrogen atmosphere for 16 hours. After the test, the front and back of the specimen was lightly wiped with a paper wiper and by performing a weight measurement, the percentage of weight increase from before test was calculated. A weight change ratio closer to 0% indicates that the oleic acid resistance is better.

<Evaluation Method of Ethanol Resistance of Polyurethane>

A urethane film was prepared by the same method as described in <Evaluation Method of Oleic Acid Resistance of Polyurethane> above, and a urethane film specimen of 3 cm×3 cm was cut out. After measuring the weight of the specimen by a precision balance, the specimen was charged into a glass-made petri dish having an inner diameter of 10 cmφ and containing 50 ml of a test solvent and immersed in the solvent at room temperature of about 23° C. for 1 hour. After the test, the specimen was taken out and lightly wiped with a paper wiper and by performing a weight measurement, the percentage of weight increase from before test was calculated. A weight change ratio closer to 0% indicates that the ethanol resistance is better.

<Evaluation Method of Ethyl Acetate Resistance of Polyurethane>

A urethane film was prepared by the same method as described in <Evaluation Method of Oleic Acid Resistance of Polyurethane> above, and a urethane film specimen of 3 cm×3 cm was cut out. After measuring the weight of the specimen by a precision balance, the specimen was charged into a glass-made petri dish having an inner diameter of 10 cmφ and containing 50 ml of ethyl acetate as the test solvent and immersed in the solvent at room temperature of about 23° C. for 20 minutes. After the test, the specimen was taken out and lightly wiped with a paper wiper and by performing a weight measurement using a precision balance, the weight change ratio (percentage increase) from before test was calculated. A weight change ratio closer to 0% indicates that the ethyl acetate resistance is better.

<Raw Materials Used>

The raw materials used for the production of polycarbonate diol and polyurethane in this Example are as follows.

1,4-Butanediol (hereinafter, sometimes simply referred to as 1,4BD): produced by Mitsubishi Chemical Corporation 1,10-Decanediol (hereinafter, sometimes simply referred to as 1,10DD): produced by Hokoku Corporation Diphenyl carbonate (hereinafter, sometimes simply referred to as DPC): produced by Mitsubishi Chemical Corporation Magnesium acetate tetrahydrate: produced by Wako Pure Chemical Industries, Ltd.

4,4'-Dicyclohexylmethane diisocyanate (hereinafter, sometime simply referred to as "H12MDI"): produced by Tokyo Chemical Industry Co., Ltd.

Triisooctyl phosphite (hereinafter, sometimes simply referred to as "TiOP"): produced by Tokyo Chemical Industry Co., Ltd.

NEOSTANN U-830: produced by Nitto Kasei Co., Ltd.

Dehydrated toluene: produced by Wako Pure Chemical Industries, Ltd.

Dehydrated N,N-dimethylformamide (hereinafter, sometimes simply referred to as "dehydrated DMF"): produced by Wako Pure Chemical Industries, Ltd.

Isophoronediamine (hereinafter, sometimes simply referred to as "IPDA"): produced by Tokyo Chemical Industry Co., Ltd.

Morpholine: produced by Tokyo Chemical Industry Co., Ltd.

Example 1

<Production and Evaluation of Polycarbonate Diol>

Into a 5 L glass separable flask equipped with a stirrer, a distillate trap and a pressure adjusting device, 1,4BD, 1,10DD having an aldehyde derivative content of 0.05 wt %, DPC, and an aqueous magnesium acetate tetrahydrate solution (concentration: 8.4 g/L) were charged as raw materials each in the amount shown in Table 1. After purging with nitrogen gas, the contents were heated and dissolved under stirring by raising the internal temperature to 160° C. Thereafter, the pressure was reduced to 24 kPa over 2 minutes, and a polycarbonate diol (PCD) was then produced by a transesterification reaction for 90 minutes with removing phenol outside the system. The reaction was continued by reducing the pressure to 9.3 kPa over 90 minutes and further to 0.7 kPa over 30 minutes. Subsequently, a transesterification reaction was performed for 120 minutes by raising the internal temperature to 170° C. with removing phenol and unreacted dihydroxy compounds outside the system, whereby a polycarbonate diol was obtained. The properties of the obtained polycarbonate diol and the evaluation results of physical properties are shown in Table 1.

Example 2

<Production and Evaluation of Polycarbonate Diol>

A polycarbonate diol was synthesized by entirely the same method as in Example 1 except that in Example 1, before charging 1,10DD as a raw material into the 5 L glass separable flask, 1,10DD was heated at 160° C. in air to oxidize part of 1,10DD to 1-hydroxy-10-decanal and then charged into the separable flask as a raw material of the polycarbonate diol.

The content of the aldehyde derivative (including 1-hydroxy-10-decanal) in 1,10DD, the properties of the obtained polycarbonate diol, and the evaluation results of physical properties are shown in Table 1.

Example 3

<Production and Evaluation of Polycarbonate Diol>

A polycarbonate diol was synthesized by entirely the same method as in Example 1 except that in Example 1, before charging 1,10DD as a raw material into the 5 L glass separable flask, 1,10DD was heated at 120° C. with bubbling with air to oxidize part of 1,10DD to 1-hydroxy-10-decanal and then charged into the separable flask as a raw material of the polycarbonate diol.

The content of the aldehyde derivative (including 1-hydroxy-10-decanal) in 1,10DD, the properties of the obtained polycarbonate diol, and the evaluation results of physical properties are shown in Table 1.

Example 4

<Production and Evaluation of Polycarbonate Diol>

A polycarbonate diol was synthesized by entirely the same method as in Example 1 except that in Example 1, before charging 1,10DD as a raw material into the 5 L glass separable flask, 1,10DD was heated at 140° C. with bubbling with air to oxidize part of 1,10DD to 1-hydroxy-10-decanal and then charged into the separable flask as a raw material of the polycarbonate diol.

The content of the aldehyde derivative (including 1-hydroxy-10-decanal) in 1,10DD, the properties of the obtained polycarbonate diol, and the evaluation results of physical properties are shown in Table 1.

Example 5

<Production and Evaluation of Polycarbonate Diol>

A polycarbonate diol was synthesized by entirely the same method as in Example 1 except that in Example 1, before charging 1,10DD as a raw material into the 5 L glass separable flask, 1,10DD was heated at 140° C. with bubbling with air to oxidize part of 1,10DD to 1-hydroxy-10-decanal and then charged into the separable flask as a raw material of the polycarbonate diol.

The content of the aldehyde derivative (including 1-hydroxy-10-decanal) in 1,10DD, the properties of the obtained polycarbonate diol, and the evaluation results of physical properties are shown in Table 1.

Comparative Example 1

<Production and Evaluation of Polycarbonate Diol>

A polycarbonate diol was synthesized by entirely the same method as in Example 1 except that in Example 1, before charging 1,10DD as a raw material into the 5 L glass separable flask, 1,10DD was heated at 160° C. with bubbling with air to oxidize part of 1,10DD to 1-hydroxy-10-decanal and then charged into the separable flask as a raw material of the polycarbonate diol.

The content of the aldehyde derivative (including 1-hydroxy-10-decanal) in 1,10DD, the properties of the obtained polycarbonate diol, and the evaluation results of physical properties are shown in Table 1.

Comparative Example 2

<Production and Evaluation of Polycarbonate Diol>

A polycarbonate diol was synthesized by entirely the same method as in Example 1 except that in Example 1 before charging 1,10DD as a raw material into the 5 L glass separable flask, 1,10DD was heated at 160° C. with bubbling with air to oxidize part of 1,10DD to 1-hydroxy-10-decanal and then charged into the separable flask as a raw material of the polycarbonate diol.

The content of the aldehyde derivative (including 1-hydroxy-10-decanal) in 1,10DD, the properties of the obtained polycarbonate diol, and the evaluation results of physical properties are shown in Table 1.

TABLE 1

| | | | Example 1 | Example 2 | Example 3 | Example 4 | Example 5 | Comparative Example 1 | Comparative Example 2 |
|---|---|---|---|---|---|---|---|---|---|
| Raw materials of PCD | Charge amount | 1,4BD [g] | 1002.7 | 1002.7 | 716.2 | 716.2 | 716.2 | 716.2 | 716.2 |
| | | 1,10DD [g] | 425.7 | 425.7 | 305.1 | 306.0 | 306.8 | 304.0 | 306.8 |
| | | DPC [g] | 2771.7 | 2771.7 | 1979.8 | 1979.8 | 1979.8 | 1979.8 | 1979.8 |

TABLE 1-continued

|  |  | Example 1 | Example 2 | Example 3 | Example 4 | Example 5 | Comparative Example 1 | Comparative Example 2 |
|---|---|---|---|---|---|---|---|---|
|  | Aqueous catalyst solution [mL] | 6.9 | 6.9 | 5.0 | 5.0 | 5.0 | 5.0 | 5.0 |
|  | Aldehyde derivative content in 1,10DD [wt %] | 0.05 | 0.15 | 0.30 | 0.50 | 0.90 | 2.35 | 1.10 |
| Physical properties of PCD | Appearance | white solid | white solid | white solid | white solid | white solid | light yellow solid | light yellow solid |
|  | APHA | 25 | 30 | 35 | 45 | 70 | 90 | 100 |
|  | Number average molecular weight | 2740 | 3030 | 2960 | 2820 | 2850 | 3680 | 2760 |
|  | Phenol content [wt %] | 0.03 | 0.06 | 0.09 | 0.07 | 0.11 | 0.17 | 0.08 |
|  | Phenoxy group terminal [%] | not detected | not detected | not detected | not detected | not detected | not detected | not detected |
|  | Aldehyde derivative content [wt %] | 0.01 | 0.02 | 0.04 | 0.06 | 0.09 | 0.19 | 0.11 |

According to Table 1, compared with Examples 1 to 5 where the aldehyde derivative content in 1,10-decanediol as a raw material at the time of production of a polycarbonate diol is from 0.01 to 1.0 wt %, in Comparative Examples 1 and 2 where the polycarbonate diol is produced using 1,10-decanediol having an aldehyde derivative content of exceeding 1.0 wt %, as seen from the value of APHA in Table 1, the color tone of PCD obtained is bad. In addition, since the content of phenol remaining in the polycarbonate diol of Comparative Example 1 is large compared with Examples 1 and 2, it is understood that the polymerization reactivity at the time of production of a polycarbonate diol is higher in Examples 1 and 2 than in Comparative Example 1.

<Production and Evaluation of Polyurethane>

In order to remove phenol contained in each of the polycarbonate diol obtained in Examples 1, 3, 4 and 5 and Comparative Example 2, the solution was fed to a thin-film distillation apparatus at a flow rate of 20 g/min and subjected to thin-film distillation (temperature: from 180 to 190° C., pressure: from 40 to 67 Pa). As the thin-film distillation apparatus, a molecular distillation apparatus, Model MS-300, manufactured by Sibata Scientific Technology Ltd., equipped with an internal condenser having a diameter of 50 mm, a height of 200 mm and an area of 0.0314 m² and a jacket, was used.

Using each of the polycarbonate diols of Examples 1, 3, 4 and 5 subjected to thin-film distillation by the method above, a specific polyurethane was produced by the following operation.

(Prepolymerization Reaction)

A separable flask having provided therein a thermocouple and a cooling tube was charged with 96.5 g of the polycarbonate diol (subjected to thin-film distillation) described in Example 1 previously heated at 80° C., and the flask was immersed in an oil bath at 60° C. Thereafter, 17.1 g of H12MDI and 0.3 g of TiOP as a reaction retarder were added, and the temperature in the flask was raised to 80° C. over about 1 hour in a nitrogen atmosphere while stirring at 60 rpm. After raising the temperature to 80° C., 7.4 mg (46.6 ppm by weight relative to the total weight of polycarbonate diol and isocyanate) of NEOSTANN U-830 was added as a urethanization catalyst and when heat generation was settled, the temperature of the oil bath was raised to 100° C., followed by stirring for about another 2 hours. The concentration of the isocyanate group was analyzed, and it was confirmed that the isocyanate group was consumed in a theoretical amount.

(Chain Extension Reaction)

After diluting 107.6 g of the obtained prepolymer with 11.5 g of dehydrated toluene, 248.4 g of dehydrated DMF was added, and the flask was immersed in an oil bath at 55° C. to dissolve the prepolymer while stirring at about 200 rpm. The concentration of the isocyanate group in the prepolymer solution was analyzed and thereafter, the flask was immersed in an oil bath set to 35° C. Subsequently, 4.3 g of IPDA, which is the required amount calculated from the remaining isocyanate, was added in parts while stirring at 150 rpm. After stirring for about 1 hour, 0.4 g of morpholine as a chain terminator was added, and the system was further stirred for 1 hour to obtain a polyurethane solution having a viscosity of 156 Pa·s and a weight average molecular weight of 180,000. The properties of this polyurethane and the evaluation results of physical properties are shown in Table 2.

Production of a polyurethane by using each of the polycarbonate diols of Examples 3, 4 and 5 subjected to thin-film distillation was performed by employing entirely the same conditions and method as in the polyurethane production method above to obtain a polyurethane except that the polycarbonate diol used was changed and the charge amount of each raw material was changed to the charge amount shown in Table 2. The properties of this polyurethane and the physical properties thereof are shown in Table 2.

(Prepolymerization Reaction of Comparative Example 2)

A separable flask having provided therein a thermocouple and a cooling tube was charged with 90.3 g of the polycarbonate diol (subjected to thin-film distillation) described in Comparative Example 2 previously heated at 80° C., and the flask was immersed in an oil bath at 60° C. Thereafter, 16.0 g of H12MDI and 0.3 g of TiOP as a reaction retarder were added, and the temperature in the flask was raised to 80° C. over about 1 hour in a nitrogen atmosphere while stirring at 60 rpm. After raising the temperature to 80° C., 8.0 mg (46.6 ppm by weight relative to the total weight of polycarbonate diol and isocyanate) of NEOSTANN U-830 was added as a urethanization catalyst. Several minutes after the addition of catalyst, gelling proceeded and since stirring at 60 rpm could not be performed, the reaction was stopped.

TABLE 2

| | PCD Used | Example 1 | Example 3 | Example 4 | Example 5 |
|---|---|---|---|---|---|
| Prepolymerization reaction | Molecular weight of PCD after thin-film distillation | 2990 | 3210 | 3070 | 3010 |
| | PCD (g) | 96.5 | 93.3 | 93.8 | 94.3 |
| | H12MDI (g) | 17.1 | 15.5 | 16.4 | 16.7 |
| | TiOP (g) | 0.33 | 0.33 | 0.34 | 0.33 |
| | U-830 (g) | 0.0074 | 0.0084 | 0.0087 | 0.0068 |
| Chain extension reaction | Prepolymer (g) | 107.6 | 102.4 | 99.8 | 98.0 |
| | IPDA (g) | 4.3 | 4.0 | 4.4 | 4.2 |
| | Toluene (g) | 11.5 | 10.6 | 11.6 | 10.2 |
| | DMF (g) | 248.4 | 236.8 | 234.1 | 226.9 |
| | Morpholine (g) | 0.43 | 0.42 | 0.47 | 0.46 |
| Polyurethane solution | Solution viscosity [Pa · s/25° C.] | 156 | 164 | 175 | 156 |
| | Weight average molecular weight in terms of polystyrene | 180,000 | 178,000 | 183,000 | 180,000 |
| Physical properties, etc. of polyurethane | 100% M (23° C.) [MPa] | 3.3 | 3.2 | 3.4 | 3.4 |
| | 300% M (23° C.) [MPa] | 14.7 | 13.2 | 14.2 | 14.0 |
| | Weight change ratio, oleic acid resistance [%] | 34 | 34 | 34 | 34 |
| | Weight change ratio, ethanol resistance [%] | 18 | 17 | 18 | 18 |
| | Weight change ratio, ethyl acetate resistance [%] | 182 | 198 | 186 | 191 |

According to Table 2, in the case of PCD produced by using 1,10-decanediol having an aldehyde derivative content of 0.01 to 1.0 wt %, urethanization proceeded without problem and physical properties of the obtained polyurethane were substantially the same irrespective of the aldehyde derivative content. On the other hand, in the case of PCD produced by using 1,10-decanediol having an aldehyde content of exceeding 1.0 wt %, gelling was caused at the time of urethanization, and it is understood that this material cannot be used as a urethane raw material.

While the present invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2014-129547) filed on Jun. 24, 2014 and the contents of which are incorporated herein by way of reference.

The invention claimed is:

1. A method for producing a polycarbonate diol, comprising:
subjecting a compound of formula (A), a compound of formula (B), and a carbonate compound to polycondensation by a transesterification reaction in the presence of a catalyst to produce a polycarbonate diol having a number average molecular weight of 250 to 5,000:

HO—(CH$_2$)$_{10}$—OH (A)

HO—R$^1$—OH (B)

wherein R$^1$ represents a substituted or unsubstituted divalent alkylene group having a carbon number of 3 to 20, wherein
the compound of the formula (A) is not included by the formula (B),
the compound of formula (A) comprises from 0.01 to 1.0 wt % of an aldehyde derivative based on the weight of compound (A), and
a mol content of carbonate compound derived terminal groups to a total number of terminal groups of the polycarbonate diol is 10 mol % or less.

2. The method for producing a polycarbonate diol according to claim 1, wherein the carbon atom on the main chain of R$^1$ is a primary, secondary or tertiary carbon atom.

3. The method for producing a polycarbonate diol according to claim 1, wherein the compound of formula (B) is at least one compound selected from the group consisting of 1,3-propanediol, 1,4-butanediol and 1,5-pentanediol.

4. A polycarbonate diol comprising:
a structural unit derived from a compound of formula (A); and
a structural unit derived from a compound of formula (B);
wherein the polycarbonate diol has a number average molecular weight of 250 to 5,000 and comprises from 0.001 to 0.10 wt % of an aldehyde derivative, based on the polycarbonate diol:

HO—(CH$_2$)$_{10}$—OH (A)

HO—R$^1$—OH (B)

wherein
R$^1$ represents a substituted or unsubstituted divalent alkylene group having a carbon number of 3 to 20, wherein the compound of the formula (A) is not included by the formula (B), and
a mol content of carbonate compound derived terminal groups to a total number of terminal groups of the polycarbonate diol is 10 moil % or less.

5. The polycarbonate diol according to claim 4, wherein the carbon atom on the main chain of R$^1$ is a primary, secondary or tertiary carbon.

6. The polycarbonate diol according to claim 4, wherein the compound of formula (B) is at least one compound selected from the group consisting of 1,3-propanediol, 1,4-butanediol and 1,5-pentanediol.

7. A polyurethane obtained by a method comprising reaction with the polycarbonate diol according to claim 4.

8. An artificial leather or a synthetic leather, comprising the polyurethane according to claim 7.

9. A coating material or a coating agent, comprising the polyurethane according to claim 7.

10. An elastic fiber, comprising the polyurethane according to claim 7.

11. An aqueous polyurethane coating material, comprising the polyurethane according to claim 7.

12. A pressure sensitive adhesive or an adhesive, comprising the polyurethane according to claim 7.

13. An active energy ray-curable polymer composition, comprising the polycarbonate diol according to claim 4.

14. A method for producing a polyurethane, comprising:
    reacting a polycarbonate diol according to claim 4 with a polyisocyanate and a chain extender to obtain the polyurethane.

15. The method for producing a polycarbonate diol according to claim 1, wherein a mol ratio of compound of formula (A)/compound of formula (B) is from 40/60 to 1/90.

16. The polycarbonate diol according to claim 4, wherein a mol ratio of compound of formula (A)/compound of formula (B) is from 40/60 to 1/90.

* * * * *